(12) United States Patent
Tolman et al.

(10) Patent No.: US 11,645,317 B2
(45) Date of Patent: May 9, 2023

(54) RECOMMENDING TOPIC CLUSTERS FOR UNSTRUCTURED TEXT DOCUMENTS

(71) Applicant: QUALTRICS, LLC, Provo, UT (US)

(72) Inventors: Bradley Tolman, Orem, UT (US); Robert David Norton, Orem, UT (US); Martin D. Mumford, Orem, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

(21) Appl. No.: 15/649,477

(22) Filed: Jul. 13, 2017

(65) Prior Publication Data
US 2018/0032606 A1 Feb. 1, 2018

Related U.S. Application Data

(60) Provisional application No. 62/366,718, filed on Jul. 26, 2016.

(51) Int. Cl.
*G06F 16/35* (2019.01)
*G06F 16/93* (2019.01)
*G06F 16/951* (2019.01)

(52) U.S. Cl.
CPC .............. *G06F 16/35* (2019.01); *G06F 16/93* (2019.01); *G06F 16/951* (2019.01)

(58) Field of Classification Search
CPC ......... G06F 16/35; G06F 16/93; G06F 16/951
See application file for complete search history.

(56) References Cited

U.S. PATENT DOCUMENTS

| | | | |
|---|---|---|---|
| 5,410,724 A | 4/1995 | Worthy | |
| 5,732,257 A | 3/1998 | Atkinson et al. | |
| 6,052,121 A | 4/2000 | Webster et al. | |
| 6,189,029 B1 | 2/2001 | Fuerst | |
| 6,754,676 B2 | 6/2004 | Dietz et al. | |
| 7,085,812 B1 | 8/2006 | Sherwood | |
| 7,233,940 B2 | 6/2007 | Bamberger et al. | |
| 7,383,200 B1 | 6/2008 | Walker et al. | |
| 7,509,382 B1 | 3/2009 | Jania et al. | |

(Continued)

FOREIGN PATENT DOCUMENTS

JP 2005198064 A 7/2005

OTHER PUBLICATIONS

U.S. Appl. No. 14/682,964, filed Jan. 10, 2018, Office Action.
(Continued)

*Primary Examiner* — Hosain T Alam
*Assistant Examiner* — Anthony G Gemignani
(74) *Attorney, Agent, or Firm* — Keller Preece PLLC

(57) ABSTRACT

Embodiments of the present disclosure generally relate to a content management system that automatically determines and generates topic clusters from a collection of electronic text documents. For example, the content management system analyzes a collection of electronic text documents to identify key terms and terms related to the key terms. Based on the key terms and related terms, the content management system generates a topic cluster that includes the key term and related terms. The content management system then organizes the electronic text documents based on terms within a given text document matching terms within a given topic cluster. Further, the content management system presents the topic clusters and organized electronic text documents to a user.

20 Claims, 24 Drawing Sheets

(56) References Cited

U.S. PATENT DOCUMENTS

| | | | |
|---|---|---|---|
| 8,019,753 B2 | 9/2011 | Podgorny et al. | |
| 8,335,719 B1* | 12/2012 | Quraishi | G06Q 30/0241 |
| | | | 705/14.49 |
| 8,417,715 B1 | 4/2013 | Bruckhaus et al. | |
| 8,543,578 B2 | 9/2013 | Spaggiari | |
| 8,751,327 B2 | 6/2014 | Park et al. | |
| 8,767,934 B2 | 7/2014 | Brunson | |
| 8,849,854 B2 | 9/2014 | Kakarla et al. | |
| 8,909,587 B2 | 12/2014 | Alush et al. | |
| 9,298,700 B1* | 3/2016 | Jesensky | G06F 40/289 |
| 9,372,592 B1* | 6/2016 | Goodspeed | G06F 16/904 |
| 9,392,334 B2 | 7/2016 | Cox et al. | |
| 9,514,436 B2 | 12/2016 | Marci et al. | |
| 9,563,695 B2 | 2/2017 | Zukerman et al. | |
| 9,785,534 B1 | 10/2017 | Paulus et al. | |
| 9,881,010 B1 | 1/2018 | Gubin et al. | |
| 9,930,102 B1 | 3/2018 | Paulus et al. | |
| 10,140,739 B1 | 11/2018 | Burgin et al. | |
| 2001/0052122 A1 | 12/2001 | Nanos et al. | |
| 2002/0052774 A1 | 5/2002 | Parker et al. | |
| 2002/0161752 A1* | 10/2002 | Hutchison | G06F 16/954 |
| 2002/0178394 A1 | 11/2002 | Bamberger et al. | |
| 2003/0105659 A1 | 6/2003 | Eisenstein | |
| 2005/0060222 A1 | 3/2005 | White | |
| 2006/0129446 A1 | 6/2006 | Ruhl et al. | |
| 2006/0195461 A1 | 8/2006 | Lo et al. | |
| 2006/0212413 A1* | 9/2006 | Rujan | G06K 9/6269 |
| | | | 706/20 |
| 2007/0150279 A1* | 6/2007 | Gandhi | G10L 13/08 |
| | | | 704/258 |
| 2007/0244865 A1 | 10/2007 | Gordon et al. | |
| 2008/0140684 A1 | 6/2008 | O'Reilly et al. | |
| 2008/0201130 A1 | 8/2008 | Peters et al. | |
| 2008/0263022 A1* | 10/2008 | Kostorizos | G06F 16/954 |
| 2009/0083096 A1 | 3/2009 | Liu et al. | |
| 2009/0094233 A1* | 4/2009 | Marvit | G06F 16/313 |
| 2009/0157714 A1* | 6/2009 | Stanton | G06K 9/6215 |
| 2009/0187486 A1 | 7/2009 | Lefenfeld et al. | |
| 2009/0210444 A1 | 8/2009 | Bailey et al. | |
| 2009/0287642 A1* | 11/2009 | Poteet | G06Q 30/02 |
| 2009/0287668 A1* | 11/2009 | Evans | G06F 16/355 |
| 2009/0306967 A1 | 12/2009 | Nicolov et al. | |
| 2010/0100515 A1 | 4/2010 | Bangalore et al. | |
| 2010/0223273 A1* | 9/2010 | Schneider | G06F 40/289 |
| | | | 707/758 |
| 2010/0280973 A1 | 11/2010 | Banker | |
| 2010/0287588 A1 | 11/2010 | Cox et al. | |
| 2011/0010182 A1 | 1/2011 | Turski et al. | |
| 2011/0076663 A1 | 3/2011 | Krallman et al. | |
| 2011/0173049 A1 | 7/2011 | McHale | |
| 2012/0143996 A1 | 6/2012 | Liebald et al. | |
| 2013/0018957 A1 | 1/2013 | Parnaby et al. | |
| 2013/0297292 A1 | 11/2013 | Agarwal | |
| 2013/0339074 A1 | 12/2013 | Nagy et al. | |
| 2013/0346128 A1* | 12/2013 | Kibbe | G06Q 10/101 |
| | | | 705/7.13 |
| 2014/0149836 A1 | 5/2014 | Bedard et al. | |
| 2014/0156349 A1 | 6/2014 | Mcloughlin | |
| 2014/0229456 A1 | 8/2014 | Hollifield et al. | |
| 2014/0234810 A1 | 8/2014 | Flor et al. | |
| 2014/0289231 A1 | 9/2014 | Palmert | |
| 2014/0310062 A1 | 10/2014 | Klein et al. | |
| 2014/0310288 A1 | 10/2014 | Jockisch et al. | |
| 2014/0310329 A1 | 10/2014 | Jones et al. | |
| 2014/0316856 A1 | 10/2014 | Williams et al. | |
| 2014/0358636 A1 | 12/2014 | Nowak et al. | |
| 2015/0052129 A1 | 2/2015 | Galvin, Jr. et al. | |
| 2015/0142888 A1 | 5/2015 | Browning et al. | |
| 2015/0161248 A1* | 6/2015 | Majkowska | G06F 16/35 |
| | | | 707/737 |
| 2015/0234571 A1* | 8/2015 | Lee | G06F 3/0488 |
| | | | 715/721 |
| 2015/0269529 A1 | 9/2015 | Kyllonen et al. | |
| 2015/0324811 A1 | 11/2015 | Courtright et al. | |
| 2015/0356174 A1* | 12/2015 | Narayana | G06F 16/35 |
| | | | 707/738 |
| 2016/0019569 A1 | 1/2016 | Jaggi et al. | |
| 2016/0070762 A1* | 3/2016 | Nicholls | G06F 16/40 |
| | | | 707/722 |
| 2016/0110789 A1 | 4/2016 | Gilb | |
| 2016/0180359 A1 | 6/2016 | Qu | |
| 2016/0196491 A1 | 7/2016 | Chandrasekaran et al. | |
| 2016/0299965 A1 | 10/2016 | Starr | |
| 2016/0350293 A1* | 12/2016 | Gates | G06F 16/93 |
| 2016/0350771 A1 | 12/2016 | Gardner | |
| 2016/0371393 A1 | 12/2016 | Allen et al. | |
| 2017/0124174 A1 | 5/2017 | Starr et al. | |
| 2017/0270098 A1 | 9/2017 | Liu et al. | |
| 2018/0246975 A1 | 8/2018 | Zheng et al. | |
| 2018/0268052 A1 | 9/2018 | Litvak et al. | |
| 2019/0146984 A1 | 5/2019 | Starr | |

OTHER PUBLICATIONS

U.S. Appl. No. 14/682,964, filed May 3, 2018, Office Action.
U.S. Appl. No. 14/927,256, filed May 31, 2018, Office Action.
U.S. Appl. No. 14/727,511, filed Jan. 9, 2019, Office Action.
U.S. Appl. No. 14/927,256, filed Feb. 25, 2019, Notice of Alowance.
Matthias Schonlau et al. "Conduction Research Surveys via E-mail and the Web" © 2002 RAND Corporation, ISBN/EAN: 0-8330-3110-4. Retrieved from https://www.rand.org/pubs/rnonograph reports/MR1480.html (Year: 2002).
No Author "Creating and using online surveys" University of Exeter Jul. 2012. Retrieved from https://as.exeterac.uk/nnedia/universityofexeter/acadernicservices/educationenhancernent/cascade/Creating and using online surveys.pdf (Year: 2012).
U.S. Appl. No. 14/682,964, filed Oct. 10, 2018, Notice of Allowance.
U.S. Appl. No. 14/727,511, filed Aug. 10, 2018, Office Action.
U.S. Appl. No. 14/927,256, filed Nov. 1, 2018, Office Action.
U.S. Appl. No. 15/199,678, filed Oct. 1, 2018, Office Action.
U.S. Appl. No. 14/682,964, filed Jun. 15, 2017, Office Action.
U.S. Appl. No. 14/727,511, filed Jun. 21, 2017, Office Action.
"A Literature Survey on Fatigue Analysis Approaches for Rubber", by W Mars and F Fatemi, Department of Mechanical, Industrial, and Manufacturing Engineering, University of Toledo, Toledo, OH 43606-3390, USA, International Journal of Fatigue 24, pp. 949-961, 2002. (Year: 2002).
U.S. Appl. No. 14/727,511, filed Jan. 29, 2018, Office Action.
LimeSurvey, 2015, https://web.archive.org/web/20150501055458/http://ie.usca.edu/Linne/handout.pdf (Year: 2015).
U.S. Appl. No. 14/727,511, filed Apr. 29, 2019, Office Action.
U.S. Appl. No. 15/199,678, filed May 10, 2019, Office Action.
U.S. Appl. No. 15/472,893, filed May 31, 2019, Office Action.
U.S. Appl. No. 14/727,511, filed Nov. 7, 2019, Office Action.
U.S. Appl. No. 15/199,678, filed Aug. 27, 2019, Notice of Alowance.
U.S. Appl. No. 15/199,678, filed Oct. 24, 2019, Notice of Allowance.
U.S. Appl. No. 15/472,893, filed Dec. 11, 2019, Office Action.
Susan J. McMurry, "JMP—An Introductory User's Guide", Jul. 24, 1992, https://www.dartnnouth.eduk-chance/teaching aids/ JMP.guide.pdf (Year: 1992).
U.S. Appl. No. 14/727,511, filed Jun. 11, 2020, Office Action.
U.S. Appl. No. 15/472,893, filed Jun. 24, 2020, Office Action.
Greg Laughlin, "Statwing Tutorial by Greg Laughlin", https://www.youtube.com/watch?v=VWqXS9nwXss (Year: 2013).
Appraisals 1st Property Solutions, "Statwing Demo",https://www.youtube.coni/watch?v=eUGwVDbc8AA (Year: 2015).
Statwing, "Statwing Website", https://wlnwstatwing.com (Year: 2015).
U.S. Appl. No. 15/472,893, filed May 14, 2021, Office Action.
U.S. Appl. No. 16/249,076, filed Jul. 21, 2021, Office Action.
U.S. Appl. No. 15/472,893, filed Dec. 28, 2020, Office Action.
Appraisals 1st Property Solutions, "Condition Adjustment using Statwing",https://www.youtube.com/watch?v=esDeihnqAic (Year: 2015).

(56) References Cited

OTHER PUBLICATIONS

Svetlana Cheusheva, "Concetenate in Excel: combine text strings, cells, and columns" (Year: 2016).
U.S. Appl. No. 15/472,893, filed Oct. 5, 2021, Office Action.
U.S. Appl. No. 16/426,806, filed Aug. 23, 2021, Office Action.
U.S. Appl. No. 16/426,806, filed Oct. 20, 2021, Notice of Allowance.
Appraisals 1st Property Solutions, "Busy Road Adjustment"; https://www.youtube.conn/watch?v=nnuUffy,I4o0w (Year: 2015).
U.S. Appl. No. 15/472,893, filed May 20, 2022, Office Action.
U.S. Appl. No. 16/249,076, filed Apr. 1, 2022, Office Action.
U.S. Appl. No. 16/249,076, filed Nov. 22, 2021, Office Action.
U.S. Appl. No. 16/249,076, Jan. 20, 2022, Office Action.
U.S. Appl. No. 15/472,893, filed Sep. 29, 2022, Office Action.
U.S. Appl. No. 16/249,076, filed Jul. 6, 2022, Office Action.
U.S. Appl. No. 16/249,076, filed Oct. 5, 2022, Office Action.
U.S. Appl. No. 17/652,899, Mail Date Oct. 14, 2022, Office Action.
U.S. Appl. No. 16/249,076, Mail Date Feb. 23, 2023, Notice of Allowance.
U.S. Appl. No. 17/652,899, Mail Date Mar. 15, 2023, Notice of Allowance.

\* cited by examiner

RECOMMENDING TOPIC CLUSTERS FOR UNSTRUCTURED TEXT DOCUMENTS

CROSS REFERENCE TO RELATED APPLICATIONS

The present application claims priority to U.S. Provisional Application No. 62/366,718 filed on Jul. 26, 2016, the entirety of which is hereby incorporated by reference.

BACKGROUND

The advent of computer technology has led to an increase in communication using various forms of electronic text documents. Examples of electronic text documents include computer data files comprising free-form text, such as responses to survey questions, e-commerce customer reviews, electronic messages (e.g., email), or social media posts (e.g., tweets). To organize and analyze text documents, conventional systems attempt to use various techniques, such as tagging, sorting, and categorizing electronic text documents. However, conventional systems which is time-consuming and prone to error. Users have attempted other automated systems, but without direct human oversight, most conventional techniques have failed. Accordingly, conventional systems and methods of organizing electronic text documents typically present several disadvantages.

As one example, an electronic survey system can administer an electronic survey to a large number of users. As a result of administering the electronic survey, the electronic survey system can receive computer data representing user responses to electronic survey questions, including user input text provided in response to a free-form answer electronic survey. Accordingly, an electronic survey can result in thousands, hundreds of thousands, millions, or more text documents that a survey administrator wants to be able to organize, categorize, and analyze in a way that provides useful and actionable information.

Conventional systems document systems are limited to offering a keyword search to identify documents that contain a word and/or a combination of words. But keywords searches are often unreliable at capturing a complete set of documents that pertain to a particular topic because users often use different words or phrasing to discuss the same topic. Moreover, user provided keywords searches often result in a large number of search results, however, a large number of search results is typically not useful for analysis or understanding the text documents. These and other limitations of conventional keyword searches are the result of most conventional systems failing to recognize or detect context for a given text document, such as the text document resulting from an electronic survey.

Moreover, conventional systems rely on an administrator to identify a topic that the administrator predicts is within the large number of text documents, and use that topic for a keyword search (e.g., customer service). Because conventional systems rely on administrators to identify a potential topic included in text documents, the conventional systems are limited to at most providing documents for topics for which the administrator specifically searches. Thus, unless the administrator performs hundreds or thousands of searches, it will often be the case that a significant topic that would be of interest to an administrator is not located, and thus, the information within the unidentified topic cannot be used.

Accordingly, there are many considerations to be made in analyzing and organizing electronic text documents.

SUMMARY

One or more embodiments disclosed herein provide benefits and/or solve one or more of the previous or other problems in the art by providing systems and methods that analyze the content of electronic text documents to automatically generate topic clusters for organizing electronic text documents. For example, the systems and methods disclosed herein analyze the content of electronic documents to automatically identify one or more statistically significant terms, or key terms, within the electronic text documents. In addition, upon identifying a key term, the system and methods generate a topic cluster that comprises the key term and additional terms related to the key term. The systems and methods use the topic clusters to identify electronic documents related to the topic cluster, and thus, organize and present electronic documents corresponding to a topic associated with the topic cluster.

To illustrate, in one or more embodiments, the systems and methods access electronic text documents where each electronic text document includes one or more terms (e.g., a single word or associated group of words). In some embodiments, the systems and methods analyze the text documents to determine significance values for various terms within the text documents (e.g., a statistical representation of the significance of a term with the collection of text documents). The systems and methods, for example, identify key terms within the collection of documents based on identifying terms that have the highest significance values. In addition, for each key term, the systems and methods identify related terms that correspond to the key term. The disclosed systems and methods then generate topic clusters that include a key term and corresponding related terms. In one or more embodiments, the disclosed systems organize the electronic text documents according to the topic clusters, and present the organized electronic text responses to the user.

In additional embodiments, the systems and methods not only automatically generate topic clusters that correspond to electronic documents within a collection of electronic documents, the systems and methods also receive user input to modify and customize one or more topic clusters. For example, the systems and methods allow a user to add related terms to a topic cluster, add a new topic cluster, remove a topic cluster, merge topic clusters, split a topic cluster into multiple topic clusters, and apply other customizations. Further, after adding or modifying one or more topic clusters based on the user input, the disclosed systems and methods can update (e.g., reorganize) the electronic text documents according to the modified topic clusters, and present the reorganized electronic text responses to the user.

Additional features and advantages of exemplary embodiments are outlined in the following description, and in part will be obvious from the description or may be learned by the practice of such exemplary embodiments. The features and advantages of such embodiments may be realized and obtained using the instruments and combinations particularly pointed out in the claims. These and other features will become more fully apparent from the following description and claims or may be learned by the practice of the example embodiments provided hereafter.

BRIEF DESCRIPTION OF THE DRAWINGS

To better describe the manner in which the systems and methods obtain the advantages and features of the disclosed embodiments, a number of example embodiments are described in connection with accompanying drawings. It should be noted that the drawings may not be drawn to scale. Further, for illustrative and explanation purposes, elements of similar structure or function are commonly represented by like reference numerals throughout the figures.

FIGS. 5B-5C illustrate example graphical user interfaces that display an expanded topic cluster (corresponding to FIG. 5A) and related electronic text documents in accordance with one or more embodiments described herein.

FIG. 6B illustrates an example graphical user interface that displays a modified topic cluster (corresponding to FIG. 6A) and related electronic text documents in accordance with one or more embodiments described herein.

FIG. 7B illustrates an example graphical user interface that displays the modified topic cluster (corresponding to FIG. 7A) and related electronic text documents in accordance with one or more embodiments described herein.

FIG. 8B illustrates an example graphical user interface that displays the expanded modified topic cluster (corresponding to FIG. 8A) and related electronic text documents in accordance with one or more embodiments described herein.

FIG. 9B illustrates an example graphical user interface that displays the split topic cluster (corresponding to FIG. 9A) and related electronic text documents in accordance with one or more embodiments described herein.

FIGS. 10B-10C illustrate an example graphical user interface that display the merged topic cluster (corresponding to FIG. 10A) and related electronic text documents in accordance with one or more embodiments described herein.

DETAILED DESCRIPTION

Figure 1:
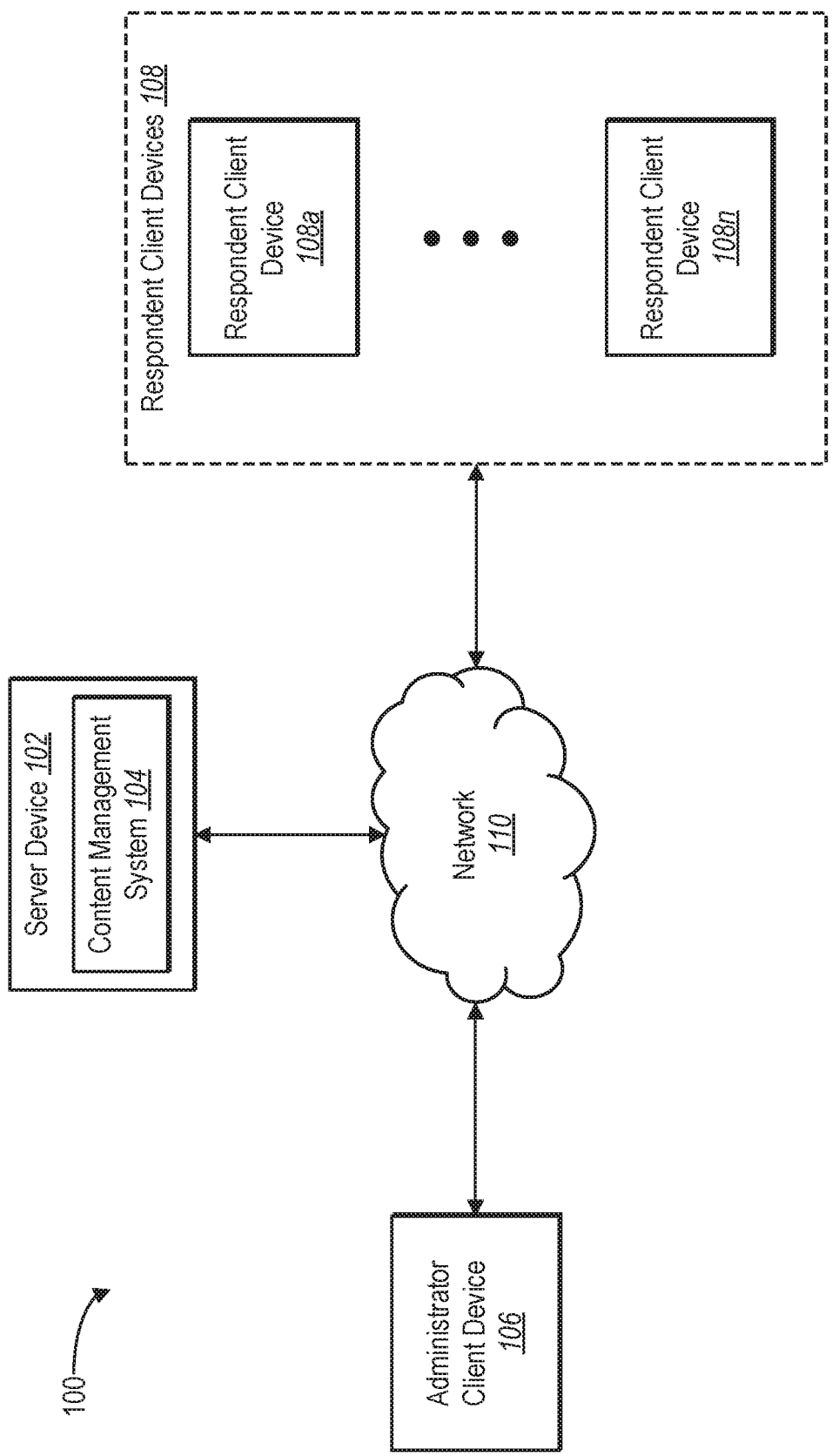
FIG. 1 illustrates an example embodiment of a communication environment in accordance with one or more embodiments described herein.

One or more embodiments disclosed herein provide a content management system that improves the organization of electronic text documents (or simply text documents) by intelligently generating recommended topic clusters for a collection of electronic text documents, where the recommended topic clusters are tailored to the collection of electronic text documents. In general, the content management system automatically analyzes text in each text document within the collection of text documents to identify key terms within the collection of text documents. Using the identified key terms, the content management system further identifies terms related to the key terms (e.g., terms having similar meaning, terms having a similar statistical significance, terms related to a similar topic). The content management system uses the key terms and related terms to form a topic cluster (e.g., a cluster of terms related to a topic). The content management system then presents, to a user (e.g., an administrator or administrative user), topics corresponding to each topic cluster identified within the collection of electronic documents. Further, the content management system can organize the electronic text documents by assigning each electronic text document to one or more topic clusters.

More specifically, in one or more embodiments, the content management system obtains a collection of electronic text documents, where each electronic text document includes one or more terms. The content management system analyzes each term in the collection of electronic text documents to determine a significance value for each term. In one or more embodiments, to determine a significance value for each term, the content management system analyzes a term within one or more electronic text documents with respect to other terms in the collection of text documents as a whole. In other words, the significance value of a given term represents the statistical significance (e.g., the importance) of the given term within the collection of electronic text documents.

As will be discussed in detail below, in one or more embodiments, the statistical significance of a term is based on analyzing the electronic text documents to determine a statistical improbable phrase (SIP) value for each term based on sample frequency values of a term within the collection of electronic text documents compared to a corpus of frequency occurrence for the term, among other factors. This analysis of each term within the collection of text documents result in an accurate prediction of the importance of a given term, as compared to conventional systems that often inaccurately identify a term based primarily on a number of occurrences of a term within a document.

Nevertheless, based on the content management system determining significance values for terms within the collection of electronic text documents, the content management system identifies and/or assigns various terms as key terms.

For example, the content management system can rank the terms based on each term's significance value, and the content management system can identify terms with the highest significance values as the key terms with the collection of documents. In some embodiments, for instance, the content management system selects the top ten, twenty, or another quantity of terms with the highest significance values as key terms for a collection of text documents. Accordingly, the key terms form a representation of probable significant concepts or topics found within a collection of electronic text documents.

Further, the content management system determines one or more related terms that correspond to each key term. For example, the content management system can identify other terms within the collection of electronic documents that relate to a given key term. In one or more embodiments, the content management system determines a context in which a key term often is used within the electronic text documents, and in turn identifies terms within the electronic text documents that are used in the same context.

In one or more embodiments, the content management system determines term vectors for each term and maps the term vectors within a vector space (e.g., n-dimensional vector space). Terms that are contextually related are located closer to each other within the vector space, and non-related terms are located further apart within the vector space. Accordingly, the content management system can employ term vectors to identify related terms for a key term by finding terms that are near (e.g., within a threshold distance of) the key term within the vector space.

Importantly, and unlike conventional systems, the content management system identifies more than just synonyms of key terms. In contrast, the content management system identifies terms that are used in a similar way and within a similar context as a key term within the specific collection of electronic text documents (e.g., terms that are related in a first collection of electronic text documents may not be related in a second collection of text documents). Accordingly, the content management system generates a group of terms for the collection of electronic text documents that may appear unrelated based on a word-to-word comparison (e.g., synonyms), but are actually contextually related to the same or similar topic as the key term within the collection of electronic text documents.

Further, and as described further below in detail, the content management system can dynamically adjust to accommodate small collection of electronic documents. In one or more embodiments, the content management system uses a pre-calculated vector space that is indicative of a particular collection of electronic text documents. This pre-calcualted vector space would be used in situations where the collection of electronic documents is too small to build a satisfactory vector space. For example, a collection of electronic text documents pertaining to a particular airline may utilize a term vector space pre-calculated for airlines in general if that particular airline does not have sufficient amounts of data. The content management system may make use of any number of heiracrchically organized collections of pre-calculated vector spaces. Returning the airline example, instead of using a general airline vector space, an even more general travel-company vector space could be used.

Additionally, the content management system generates topic clusters that include a key term and the related terms corresponding to the key term. For example, the content management system associates the key term with the related terms to form a cluster of terms that correspond to a topic.

As will be explained in detail below, the terms the content management system assigns to a given topic cluster can be based on a degree of proximity between a potential related term within a multi-dimensional vector space, where the degree of proximity represents a degree of contextual relatedness between terms within the collection of electronic documents.

Based on generating topic clusters, the content management system can provide a list of topics, where each topic corresponds to a particular topic cluster. In additional embodiments, the content management system provides an intuitive graphical user interface that organizes the electronic text documents by topic cluster. For example, upon a user selecting a content management system generated topic associated with a topic cluster, the content management system can identify those electronic text documents corresponding to the particular topic using the topic cluster. Further, the content management system can highlight the occurrences of the terms within the electronic text documents corresponding to a selected topic. In this manner, the content management system allows users to quickly identify and efficiently digest a large number of electronic text documents within the collection of electronic text documents that relate to a particular topic.

Furthermore, in some embodiments, the content management system enables a user to modify one or more topic clusters (e.g., customize a topic cluster) via the graphical user interface. For example, based on receiving user input requesting a topic cluster modification, the content management system modifies a topic cluster. For example, a user can provide input that adds additional related terms to a topic cluster, removes terms from a topic cluster, splits a topic cluster into two or more separate topic clusters, and other modifications disclosed below. The content management system can also update how each electronic text document relates to the modified topic clusters to allow the user to readily view the electronic text documents that relate to the customized topic clusters.

As discussed above, and as will be explained in additional detail below, the features, functions, methods and systems the content management system provides results in numerous benefits over conventional systems. For example, in contrast to conventional systems that rely on keywords that a user guesses will relate to electronic text documents searches, the content management system analyzes a collection of electronic text documents to analytically determine and identify significant topics within a collection of electronic text documents. Moreover, and unlike conventional systems, the content management system determines significant topics by statistically determining how terms are used with respect to context within electronic text documents.

The ability to generate and identify topics based on an analysis of the actual text documents results in several benefits that conventional systems are unable to achieve. For instance, because the content management system can identify topics within a collection of electronic text documents based solely on an analysis of content within the collection of text documents, the content management system can identify topics that may have otherwise gone unnoticed. For example, in conventional systems, topics are often pre-defined, and thus are limited to only those topics that an administrator guesses may be included in a collection of documents. Thus, unlike conventional systems that are unable to determine topics without first receiving a set of predefined topics, the content management system automatically determines topics based on the actual content included within the collection of text documents. For instance, the content management system can determine an unexpected or previously unknown topic within a collection of text documents.

Similarly, and as explained above, conventional systems are often constrained by a list of predefined topics. Due to this constraint, users often create a large list of topics to avoid the potential of missing a text document based on not providing a predefined topic related to a particular text document. Searching a collection of text documents using a large list of predefined topics consumes significant computing resources and processing time. The content management system disclosed herein, however, increases the efficiency of a computer system based on conducting an analysis on a collection of documents to determine only those topics that actually relate to the collection of documents, while avoiding the inefficient use of computing resources to analyze the collection of documents using a significant number of topics that are likely not related to any text document within the collection.

Additionally, the content management system reduces errors that commonly occur in conventional systems. In particular, conventional systems often result in erroneous results due to the conventional system identifying an irrelevant term within a number of electronic documents. Accordingly, conventional systems often provide a user with a set of electronic documents that are not actually associated with a significant topic, but are rather associated with an irrelevant or unimportant word. In contrast, in some embodiments, the content management system identifies terms having a low significance value, and accordingly, minimizes the effect of the low significance terms from the analysis in generating a topic cluster, as discussed in further detail below.

As another advantage over conventional systems, the content management system eliminates the need for a user reviewing electronic text documents to have an expert knowledge of the domain of the documents or inferred intent. In particular, because the content management system automatically recommends an initial set of important and relevant topic clusters, described by key terms as well as related terms, words, and phrases, the content management system enables even novice users to efficiently review a large number of electronic text documents. In one or more embodiments, the content management system emphasizes topic clusters that are unique and relevant to a particular collection of electronic text documents. Further, the content management system enables a user to interact, refine, and customize the recommended topic clusters. For instance, the content management system enables a user to refine the recommended topic clusters for even higher accuracy even when the user has expert knowledge of a domain of the documents or inferred intent.

The content management system provides additional benefits over conventional systems. For instance, conventional systems such as parser and ontology-based systems fail to identify misspelled terms that describe a topic, leaving the misspelled words as outliers and ignoring the text documents that include the misspelled words. Similarly, conventional systems fail to identify and group terms together that are used in the same context, even when the terms have distinct definitions. On the other hand, the content management system groups misspelled terms with the correctly spelled word based on identifying misspelled words being used in the same context as a correctly spelled word. Moreover, the content management system identifies and groups terms together that are used in the same context even when the terms have distinct definitions.

Additional information about the content management system is presented below in connection with the figures. To illustrate, FIG. 1 shows a schematic diagram of a communication system 100. As illustrated, the communication system 100 includes a server device 102 that hosts a content management system 104, an administrator client device 106 (associated with an administrator), and respondent client devices 108a-n (associated with corresponding respondents), where each device connected via a network 110. As shown in FIG. 1, the respondent client devices 108a-n are collectively referred to as "respondent client devices 108". Additional details regarding the various computing devices (e.g., respondent client devices 108 and server device 102) and networks (e.g., network 110) are explained below with respect to FIGS. 13 and 14.

Although FIG. 1 illustrates a particular arrangement of the content management system 104, administrator client device 106, respondent client devices 108, and the network 110, various additional arrangements are possible. For example, the administrator client device 106 can directly communicate with the server device 102 hosting the content management system 104, bypassing the network 110. Further, while only one administrator client device 106 and two respondent client devices 108 are illustrated, the communication system 100 can include any number of administrator client devices and respondent client devices 108.

As mentioned above, the content management system 104 analyzes and organizes a collection of electronic text documents. As used herein, the term "electronic text document" (or simply "text document," or "document") refers to electronic text data. For example, a text document can include unstructured text data. Furthermore, a text document may be used to convey information from one user (e.g., an author of a text document), to another user (a recipient of a text document). Examples of text documents include, but are not limited to, electronic survey free-form text responses, electronic messages (IM, email, texts, etc.), word processing documents, webpages, or other electronic document or file that includes textual data.

Further, the term "collection of electronic text documents" (or simply "collection of text documents," "collection of documents," or "collection") generally refers to multiple text documents that are related, linked, and/or otherwise associated. A collection of text documents can include two or more text documents, but often includes many text documents (e.g., hundreds, thousands, hundreds of thousands, millions, or more). In some embodiments, a user can combine or otherwise associate individual text documents together in a collection of text documents. Alternatively, the collection of text documents can include those documents that are combined automatically by one or more systems.

As related to content of a text document, the term "term" generally refers a combination of text or symbols that represent a language element. For example, a term can refer to text content within electronic text document. A term can be a single word (e.g., "product"), a compound word (e.g., "toolbox"), or a string of words (e.g., "customer service" or "proof of purchase"). In addition, a term can include a combination of terms that make up a phrase or sentence. Moreover, a term can include a symbol that connotes a meaning, such as an emoji.

For example, and as illustrated in the example communication environment of FIG. 1, a collection of text documents can include text responses that are user responses to an electronic survey. As an example, the content management system 104 (or electronic survey system associated with the content management system 104) administers an electronic survey with one or more open-ended electronic survey questions to respondents associated with the respondent client devices 108. The respondents complete the electronic survey question by inputting free-form text at the respondent client devices 108, and the respondent client devices 108 provide the text responses to the content management system 104 (e.g., via network 110). The content management system 104 can then analyze the text responses to determine topics of the content within the text responses, and provide the topics and resulting analysis to the administrator client device 106.

In such an example, the content management system can organize text responses into a collection of text responses received in relation to a particular electronic survey question, text responses received in relation to multiple electronic surveys within a single electronic survey, text responses received in relation to the same question in multiple surveys, and/or text responses received in relation to multiple questions in multiple surveys. Throughout the detailed description, various examples are provided where the content management system 104 relates to text responses (e.g., text responses to electronic survey questions), however, one will appreciate that the concepts and principles described in those examples apply to text documents of any kind.

As used herein, the term "electronic survey question," "survey question," or simply "question" refer to an electronic communication used to collect information. For example, a survey question is an electronic communication that causes a client device to present a digital prompt that invokes or otherwise invites a response interaction from a user of the client device (e.g., a respondent). In particular, a survey question can include an open-ended question that allows a user to provide free-form text as a response to the survey question.

As used herein, the terms "electronic survey" or simply "survey" refer to a digital organization of one or more electronic survey questions. In one or more embodiments, an electronic survey is a digital file or files on a survey database that facilitate the distribution, administration, and collection of responses of one or more survey questions associated with the electronic survey. Moreover, an electronic survey as used herein may generally refer to a method of requesting and collecting electronic data from respondents via an electronic communication distribution channel.

As used herein, the term "response" refers to electronic data provided in response to an electronic survey question. The electronic data may include content and/or feedback based on user input from the respondent in response to a survey question. Depending on the survey question type, the response may include, but is not limited to, a selection, a text input, an indication of an answer selection, a user provided answer, and/or an attachment. For example, a response to an opened-ended question can include free-form text (i.e., a text response).

Figure 2:
FIG. 2 illustrates a general flow diagram of generating and presenting topic clusters to a user in accordance with one or more embodiments described herein.

FIG. 2 illustrates a flow diagram of generating topics, topic clusters on which the topics are based, and text documents relating to the topics for presentation to a user (e.g., administrator). FIG. 2 provides a general framework and overview of the various methods, processes, and functions the content management system employs to generate and present recommended topics, topic clusters, and text documents to a user. The content management system described in connection with FIG. 2 can be an embodiment of the content management system 104 described with respect to FIG. 1.

As shown in FIG. 2, the content management system obtains text documents 202. For example, the content management system receives a collection of text documents that include unstructured text data. In general, the collection of text documents corresponds to a group of unorganized text documents. For example, the text documents may include text responses to one or more open-ended survey questions posed to a group of respondents. In another instance, the collection of text documents can include customer reviews received on a social media platform, a website, email, or a combination thereof. Accordingly, and as discussed above, the collection of text documents may include any number of text documents that have been either automatically included in a collection (e.g., by a computer system), or manually included in a collection (e.g., a user-defined collection).

In one or more embodiments, the content management system stores the text documents in a database for later access and organization. For example, the content management system stores the text documents in a local documents database. Alternatively, the content management system accesses the text documents from a remote device, such as a cloud storage device. Storing text documents is described further below.

Based on an analysis of the collection of text documents, the content management system identifies key terms 204 within the collection of text documents, as shown in FIG. 2. In general, the content management system identifies key terms from unique, salient, and/or significant terms found in the text documents. In particular, the content management system identifies key terms that are of particular interest to a user. More specifically, the content management system identifies key terms based on the content management system determining a significance value for each term within the collection of text documents.

In one or more embodiments, the content management system determines a significance value for a term based on various factors or combinations of factors. For instance, the content management system can determine a significant value at least in part based on the uniqueness of a given term. For instance, the content management system can perform a table lookup within a term uniqueness database to obtain a uniqueness value for each term. Alternatively, or additionally, the content management system uses an algorithm that determines a significance value based on term length, complexity, and/or usage in common vernacular.

Furthermore, the content management system can determine a significance value for a term based on a SIP (Statistically Improbable Phrase) value for a given term. In generally, a "SIP value" of a term represents the probably of usage of a given term within the given collection of text documents. Although a detailed description of determining a SIP value for a term will be explained below, generally a SIP value for a term refers to the frequency of the term occurring in a given collection of text documents (e.g., a set of survey responses) relative to the frequency of the term occurring in a text corpus that defines a universal usage probability of the given term. For example, the content management system determines a term's significance value by comparing how often the term is used in the collection of text documents to how often the term is used in the text corpus. Accordingly, the content management system identifies key terms 204 within the collection of text documents based on a term's significance value. Additional detail regarding determined significance values and identifying key terms is provided in connection with FIG. 3A below.

FIG. 2 further illustrates that the content management system identifies similar/related terms 206 for each identified key term. The content management system can analyze the text documents to identify additional terms within the collection of text documents that relate to a given key term. For example, the content management system can identify related words based on natural language processing techniques used to identify complimentary terms to a key term. Additionally, the content management system can identify related terms by determining terms that are used in a similar context as the key term within the collection of text documents. As will be explained in additional detail with respect to FIG. 3A, in one or more embodiments, the content management system identifies similar or related terms based on a vector word analysis.

After identifying key terms and any corresponding related terms, the content management system creates topic clusters 208, as FIG. 2 illustrates. For example, the content management system generates topic clusters from the one or more key terms and corresponding related terms identified for each key term. As used herein, the term "topic cluster" refers to a grouping of terms. For instance, a topic cluster can include a group of terms relating to a particular topic. As will be described in detail below, a topic cluster can include a key term and one or more terms related to the key term. In such a case, the key term in a topic cluster represents the topic, and thus, the content management system uses the key term as an identified topic corresponding to a topic cluster (e.g., the content management system labels a topic cluster with the key term).

As further shown in FIG. 2, the content management system provides the text documents organized by topic 210 for presentation to a user. In general, the content management system provides a topic, a corresponding topic cluster, and text documents relating to the topic for presentation to a user within a graphical user interface. Multiple example graphical user interface views are provided in some of the figures below. Based on acts 202-210, the content management system automatically recommends significant topics within a collection of documents in response to generating topic clusters based on an analysis of the collection of text documents.

Figure 3A:
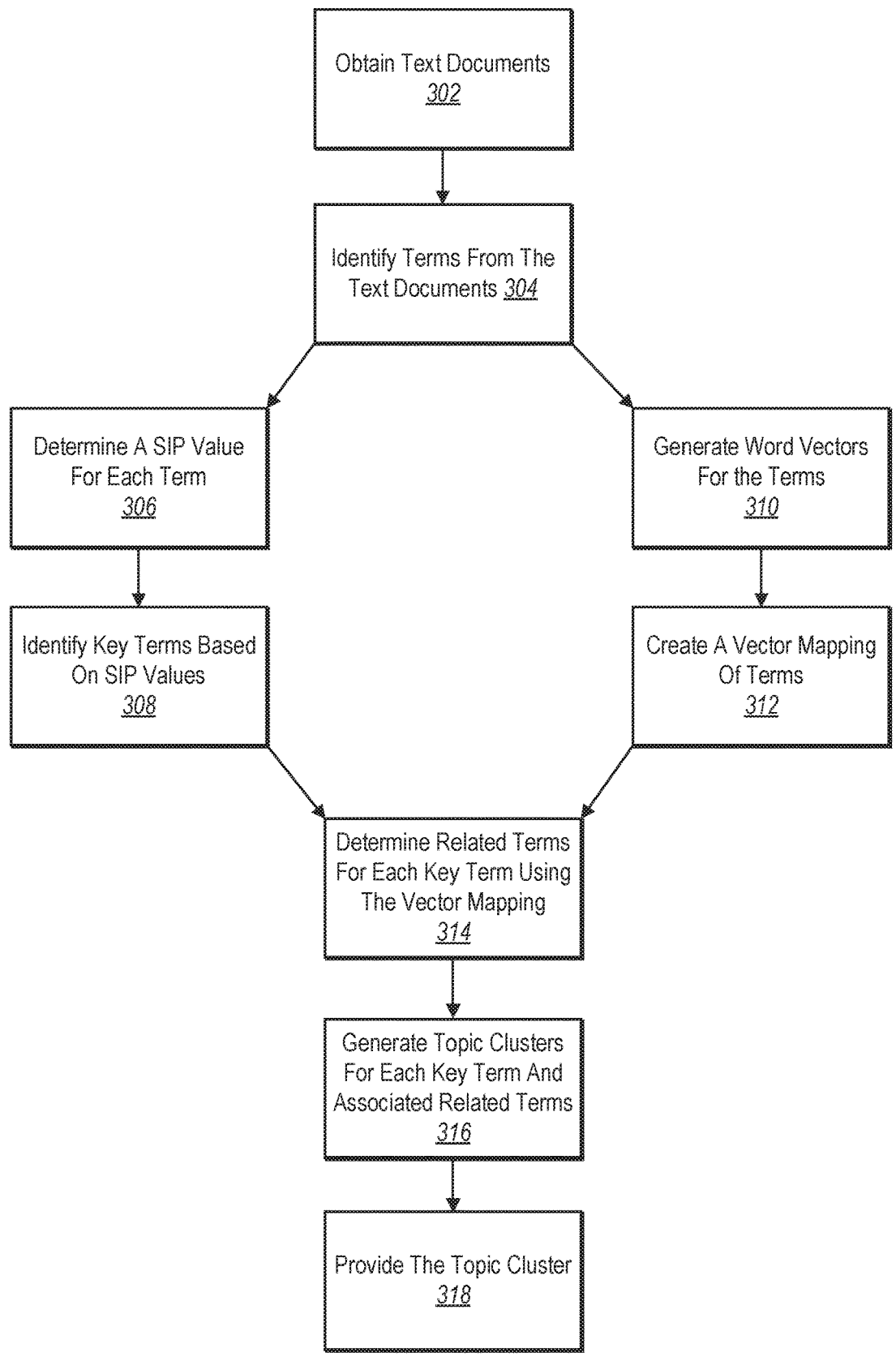
FIGS. 3A-3B illustrate a more detailed flow diagram of generating and presenting topic clusters to a user in accordance with one or more embodiments described herein.

FIG. 3A illustrates a more detailed flow diagram for generating and presenting topic clusters to a user. A content management system (e.g., content management system 104) can perform the acts shown in FIG. 3A. For example, a content management system obtains 302 text documents (e.g., a collection of text documents), as described above. Additionally, the content management system identifies 304 one or more terms within the text documents. In one or more embodiments, the content management system uses a natural language processing pipeline to identify each unique term in the text documents. Alternatively, the content management system identifies terms in the text documents using a dictionary-based approach.

Upon identifying terms within the collection of text documents, in some embodiments, the content management system stores each term in a table or database. Further, the content management system can store metadata in the table or database along with each term. For example, the content management system indicates the number of times a term is used overall and/or the number of text documents that include the term. In addition, the content management system can store adjacent terms to the term, such as terms that precede or follow a term (e.g., a number of defined terms that precede a term and/or a number of terms that follow a term). Furthermore, the content management system can store identified variations of a term (e.g., "toolbox," "tool box," "tool-box," and "too box")

Using the identified terms from the text documents, the content management system performs multiple actions. In one or more embodiments, FIG. 3A illustrates the content management system determining SIP values to identify key terms. As another example, FIG. 3A illustrates the content management system generating word vectors and creating a vector mapping. The content management system can perform these actions in parallel. Alternatively, the content management system performs one set of actions before performing the other set of actions. Each set of actions is discussed below in turn.

As mentioned, the content management system identifies key terms by determining a significance value for each term based on a predicted importance of the term within the collection of text documents. For example, FIG. 3A shows the content management system determines 306 a SIP value for each term. A SIP value, as introduced above, is a statistically improbable phrase value. In various embodiments, a term's SIP value represents the term's significance value. By determining a term's SIP value, the content management system can identify terms within the text documents that are unique, relevant, and statistically significant with the collection of text documents.

In one or more embodiments, to determine a SIP value for a term, the content management system compares a sample frequency of occurrence to a corpus frequency of occurrence. The sample frequency of occurrence represents the frequency of occurrence for a given term within the collection of text documents being analyzed. On the other hand, the corpus frequency of occurrence represents the frequency of occurrence for a given term within a defined text universe based on a text corpus.

In one or more embodiments, a text corpus is a text document, set of text documents, or set of terms that includes a usage of terms that the content management system uses as a standardized or "universal" frequency of occurrence for each term. A text corpus, for example, can include a training set of documents. Additionally, a text corpus can include one or more large or voluminous text documents that are determined to represent a conventional, standard, or normal frequency of usage for a given term.

In some embodiments, to determine a SIP value, the content management system employs the equation:

$$SIP = \frac{f_t}{F_t}$$

where $f_t$ is the frequency of term t in the collection of text documents, and $F_t$ is the frequency of term t in the text corpus. Specifically, $f_t$ is the number of times the term appears in the text documents over the total number of words in the collection of text documents. Likewise, $F_t$ is the number of times the term appears in the text corpus over the total number of words in the text corpus. In some embodiments, when the term does not appear at all in the text corpus, the content management system replaces $F_t$ with a default value such as 1, 0.1, or another positive non-zero value.

In some embodiments, rather than analyzing the entire collection of text documents or text corpus, the content management system analyzes only a sample portion. For example, the content management system analyzes a random sample of 10% of a text corpus to determine the corpus occurrence frequency. In other examples, the content management system determines sample portions based on a date range, a limited topic section, a maximum number of words, etc.

As mentioned above, generally a text corpus includes a large compilation of terms. For example, the text corpus includes the text of survey responses for all surveys administered by a survey company, or all survey responses corresponding to a particular domain (e.g., travel, shopping, customer service, etc.). In some cases, the text corpus includes text from a news corpus (e.g., GOOGLE news text corpus), a book or collection of books, or other large text document collections. Further, the text corpus can be static or dynamic. For example, a text corpus that includes news stories can be updated as additional responses are received (e.g., add new stories and, in some cases, remove older new stories). In one or more embodiments, the text corpus of terms is customized for a particular industry or field (e.g., electronics, customer/retail, academics).

As mentioned above, the content management system calculates SIP values for each term in the collection of text documents by comparing the sample frequency occurrence for each term to the term's text corpus frequency occurrence. For common terms, such as "and," "the," and "a," the content management system will likely determine the collection of text documents include these terms at about the same as is found in the text corpus. Accordingly, the significance values for these terms will often result in low SIP values (e.g., near or less than one).

Conversely, the significance values for terms that are relevant or otherwise significant within a collection of text documents will result in higher SIP values. For example, the terms that are significant within the collection of text documents will likely have a higher SIP value as significant terms are likely to appear at more frequent rate in the collection of survey responses than in the text corpus. Stated differently, the sample frequency occurrence of these terms will likely be greater than the corresponding corpus frequency occurrence because significant terms for a specific collection of text documents will likely be higher than a standard rate of use within the text corpus.

As a note, while SIP values for terms can vary drastically from one collection of text documents to another, SIP values for terms are relative to a specific collection of text documents. To illustrate, in cases where the domain of the text documents is similar or overlaps the domain of the text corpus, the SIP value for terms will be lower on average. Alternatively, in cases where the domain of the text documents is unrelated to the domain of the text corpus, the SIP value for terms will be higher on average. However, because the collection of text documents is analyzed with respect to the same text corpus, the SIP value for a term in a collection of text documents is measured relative to the other terms within the collection. Therefore, the actual SIP values for terms within a collection of text documents are often irrelevant, rather, it is the comparison of SIP values between the terms within the collection of documents that predict the significance of each term irrespective of the text corpus the content management system employs.

In one or more embodiments, the content management system filters out terms having a significance value below a threshold value (e.g., below 10, 5, or 1, depending on SIP values for a given collection of documents resulted from a given text corpus). For example, as mentioned above, the terms "and," "the," and "a," often result in having low SIP values. In addition, other terms, depending on the domain of the collection of documents and the domain of a text corpus can result in SIP values below the threshold value.

For example, for a collection of documents representing a survey about "Product X," and where the text corpus is based on historical responses about "Product X," the term "Product X" may have a low SIP value. This result is desirable because an administrator of the survey knows the survey is about Product X, and thus the administrator does not want to locate text documents that include the term Product X, but rather, the administrator wants to identify significant topics or themes that relate to Product X. As such, the content management system can filter out, remove, or disqualify these terms from being considered as a key term and/or a related term.

Similarly, in one or more embodiments, the content management system employs a list of one or more "stop terms" or exclusion terms. Examples of stop terms may include "any," "come," "her," "into," "is," "seven," "soon," "you," etc. While some stop terms may result in a high SIP value, users (e.g., administrators) may not find such terms to be particularly useful or relevant to the text documents. The content management system can receive a stop terms list from the user and/or derive the stop terms list based on past interactions with the user.

In other embodiments, however, because the content management system uses a text corpus to compare statistical probabilities, a stop terms list is not necessary in many cases. Stated differently, because the content management system employs a text corpus, the content management system determines that most stop terms will have low significance values. Thus, the content management system will likely filter out these terms automatically within a predefined stop terms list.

In some embodiments, the content management system can remove or disqualify a term that is not relevant to the particular collection of text documents irrespective of the terms significance value. For example, the content management system determines that a particular term is generic for the particular collection of text documents. For instance, if an identified term has a text document usage percentage (e.g., the number of text documents in which the term is used over the total number of text documents) over a threshold text document usage percentage, the content management system determines that the term is generic. As such, the content management system removes the term from the identified terms or disqualifies the term from consideration as a key term and/or a related term.

To illustrate, Company ABC administrates a survey for Product XYZ. The content management system analyzes the survey responses and determines that both "Company ABC" and "Product XYZ" are generic terms. As such, the content management system disqualifies these terms as potential key terms and/or related terms because these terms are not unique and appear in percentage of responses over a threshold percentage, indicating the term is generic, and thus has little to no significance within the collection of text documents.

As further shown in FIG. 3A, the content management system identifies 308 key terms based on SIP values. For example, the content management system ranks or prioritizes terms from a collection of text documents based on each term's determined SIP value. The content management system then selects one or more terms as key terms based on the one or more term's SIP value (i.e., significance value) ranking. As noted above, the key terms selected by the content management system can be called initial key terms or recommended key terms because the content management system automatically selects the key terms without user input, intervention, or interaction.

In some embodiments, the content management system selects a predetermined number of terms number as key terms, such as a key term count N (where N is any positive integer). For example, the content management system selects ten terms (or another predefined/default value) having the highest SIP values as key terms for a collection of text documents. Alternatively, the content management system determines how many key terms to select based on a user preference, device capability (e.g., screen size), total number of terms within the collection of text documents, or another constraint. Accordingly, the content management system uses the key terms as representations of significant topics within the collection of text documents.

In addition to determining key words within a collection of text documents, the content management system can concurrently, or separately, perform one or more actions with respect to the collection of text documents. For example, and as further shown in FIG. 3A, the content management system generates 310 word vectors for the terms in the collection of text documents to create a word vector model for terms within the collection of text documents. In general, a word vector model represents a determined context that typical is associated with a given term. In other words, a word vector model represents a prediction of what word or words are likely to appear based on a given context (e.g., other terms) within a collection of text documents.

The content management system can employ various methods, such as a word-to-vector operation, to generate word vectors (i.e., word embeddings) for each term. As an overview, word vectors enable the content management system to identify relationships between two or more terms based on a similarity of other terms that often are located proximate the two or more terms. By generating word vectors for each term, the content management system can create a vector space model that provides relationships between the terms, where terms that share common contexts are located near (e.g., in close proximity) one another in the vector space model.

When the number of terms in the text documents is large, the vector space can include several hundred dimensions where each term is assigned a corresponding vector. Despite a large vector space, the content management system can create and analyze word vectors for each term. In some embodiments, when the size of the collection is small, the content management system creates word vectors by combining the collection of text documents with other related text documents. For example, if the content management system maintains a database of word vectors for a particular entity or group of entities (e.g., schools, merchants, governments), and the content management system can add text documents for a similar entity to improve the reliability of the vector space model.

To illustrate, in one or more embodiments, the content management system uses a pre-calculated vector space that is indicative of a particular collection of electronic text documents. For example, the content management system employs this pre-calculated vector space where the collection of electronic documents is too small to build a satisfactory vector space. For instance, a collection of electronic text documents pertaining to a particular airline may utilize a term vector space pre-calculated for airlines in general if the particular airline does not have sufficient amounts of data. The content management system may make use of any number of hierarchically organized collections of pre-calculated vector spaces. Returning to the airline example, instead of using a general airline vector space, an even more general travel vector space could be used.

As mentioned above, in connection with generating word vectors for each term, the content management system creates 312 a vector mapping of the terms, as shown in FIG. 3A. In particular, the content management system maps the word vector for each term in an n-dimensional vector space based on a given term's word vector. Thus, terms that are contextually similar will be located near each other (as measured using the cosine similarity of the word vectors or other means). As an illustration, a collection of text documents includes the terms "flight attendant" and "stewardess." If these terms are located interchangeably in the collection of text documents, the terms will appear near similar terms, which indicates the terms are used in the same context. For instance, "flight attendant" and "stewardess" may each appear near the terms "courteous," "attentive," and "helpful" in a statistically significant rate. Thus, the vector mapping of "flight attendant" and "stewardess" within a vector space would indicate that these terms are likely related or interchangeable terms based on consistently being used within the same context across the collection of text documents.

By generating word vectors for terms and mapping (e.g., embedding) the terms in a vector space model, the content management system is doing more than determining synonyms for a particular term. Rather, the content management system employs the word vectors embedded in vector space to determine relationships between terms within the specific collection of text documents. For instance, the content management system determines latent relationships between terms in a collection of text documents that conventional systems fail to observe.

As one example, the content management system identifies relationships between misspelled words that have distinct meanings, but were intended by a respondent to be the same term (e.g., the terms "flight" and "fight"). To further illustrate, the content management system locates the terms "flight attendant," "fight attendant," and "flight attdendent" near each other in a vector mapping because the misspelled terms are used in the same context as the correctly spelled terms. As shown in this example, the content management system properly accounts for misspelled terms, whereas conventional systems automatically dismiss these terms as outliers or competing terms.

In addition to misspelled terms, the content management system can place seemingly unrelated terms near each other when the terms are contextually similar to each other, even when the terms are not synonyms or seemingly related. In contrast, conventional systems, such as parser and ontology-based systems, fail to cluster such terms if they have distinct definitions. To illustrate, the content management system obtains text documents that include a class survey from students at a religious academic institution. The text documents include terms "instructor" and "father," which outside of the specific collection of text documents appear unrelated. However, upon the content management system generating word vectors and the vector space mapping within a vector space model for the collection of text documents, the content management system identifies that the term "instructor" is located proximate the terms "teacher," "professor," "father," "rabbi," "brother," and "sister" within the vector space model. As such, based on the vector space mapping of word vectors, the content management system determines that the terms "instructor," "teacher," "professor," "father," "rabbi," "brother," and "sister" are contextually equivalent.

Returning to FIG. 3, the content management system determines 314 related terms for each key term using the vector mapping. As mentioned above, the content management system uses significance values (e.g., SIP values) of terms to select key terms. Further, the content management system generates a vector mapping of the terms in a collection of text documents. Then, for each identified keyword, the content management system can determine one or more related terms. In particular, the content management system can locate a key term in the vector space model, and once located, the content management system determines what other terms are mapped (e.g., located) within a similarity threshold (e.g., A) of the key term. For each term within the similarity threshold from the key term, the content management system determines the term is related to the key term.

The content management system can define the similarity threshold using a number of methods, techniques, and/or approaches. In one or more embodiments, the similarity threshold includes all terms that are within a threshold cosign distance of the key term (e.g., based on the respective word vector values). In another example, the similarity threshold includes a threshold number of terms, such as the five closest terms. Alternatively, the similarity threshold is a number range, having a minimum limit and/or a maximum limit.

Alternatively, or additionally, the similarity threshold includes terms associated with the key term. For instance, in some embodiments, the content management system uses a lexicographic code chart or a thesaurus rather than word vectors. To illustrate, the similarity threshold includes terms listed proximate the key term in the lexicographic code chart. In another example, the similarity threshold includes terms listed proximate the key term as provided by a thesaurus. When using a table, such as a lexicographic code chart or thesaurus, the similarity threshold can include a set number of terms in the table adjacent to (e.g., above or below) the key terms.

As mentioned above, the content management system can prevent (e.g., disqualify) one or more terms from being considered as a related term. For example, the content management system prevents terms with a significance value (e.g., SIP value) below a minimum significance threshold (e.g., B) from being associated with a key term. To illustrate, for the identified key term of "salesperson," the content management system determines that the terms "he" and "she" are very related. However, because the terms "he" and "she" have a significance value (e.g., SIP value) below the minimum significance threshold, the content management system prevents these terms from being associated with the key term "salesperson" as related terms.

In one or more embodiments, the content management system enforces a mutually exclusive constraint for terms. For instance, a term cannot be both a key term and a related term associated with another key term or listed as a related term for multiple key terms. The content management system can enforce a mutually exclusive constraint for terms by employing a strict order of operations. For instance, the content management system first determines related terms for the key term with the highest significance value. If the content management system identifies a term as a related term for the key term, the identified term cannot serve as a key term or a related term for another key term. The content management system then determines related terms for a key term with the next highest significance value, and continues this process until each key term is associated with a set of related terms.

In alternative embodiments, the content management system can allow for duplicate terms in key terms and/or related terms. For example, if the collection size is too small, the content management system can minimize the mutually exclusive constraint to create clusters that share one or more terms. Likewise, the content management system may provide a user preference that enables a user to choose whether and when the content management system can use a particular term as a key term and related term.

As shown in FIG. 3A, the content management system generates 316 topic clusters for each key term and related terms associated with each key term. Specifically, the content management system groups each key term with terms determined to be related to the key term, as described above. Accordingly, if the content management system identifies N key terms (e.g., the terms in the text documents having the N highest significance values) and related terms for each key term, the content management system generates N topic clusters.

For each generated topic cluster, the content management system can store the generated topic clusters in a table or database. For example, the content management system stores topic clusters in a two-dimensional array (e.g., a vertical array where each node contains a horizontal array). For instance, in each root node in the vertical array, the content management system stores the key term of the topic cluster. Then, in each horizontal array, the content management system stores the related terms associated with the key term. Alternatively, the content management system employs another type of data structure to store and organize the generated topic clusters.

Once the content management system generates initial topic clusters, the content management system provides, for presentation to a user, the topic (key term), topic clusters (key term and related terms) and/or text documents corresponding to a topic cluster. In particular, the content management system provides 318 the topic cluster for presentation to a user, as illustrated in FIG. 3A. For example, the content management system provides the topic clusters to an administrator client device, which presents the topic clusters to the administrator user within a graphical user interface.

In one or more embodiments, the content management system provides a presentation of text documents to a user organized by topic cluster (e.g., using topic labels or key words to represent the topic clusters). Further, in some embodiments, the content management system enables the user to request modifications to one or more topic clusters. Upon receiving a modification request, the content management system modifies one or more topic clusters, reorganizes the text documents based on the one or more modified topic clusters, and updates the presentation of text documents to the user. These and other embodiments are provided in connection with FIG. 3B.

Figure 3B:
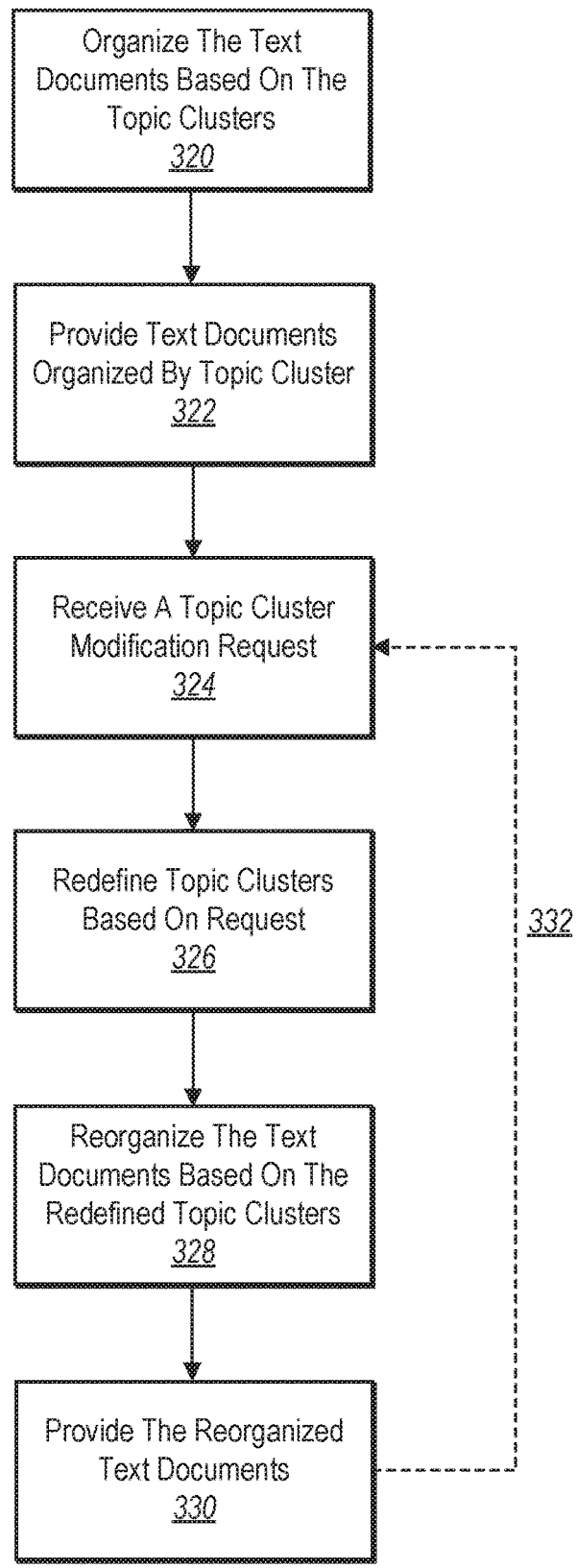

In FIG. 3B, the content management system organizes 320 the text documents based on the topic clusters. For example, the content management system determines, for each topic cluster, which text documents in the collection of text documents include at least one term from the topic cluster. For simplicity, as used herein, the term "cluster-matched documents" refers to text documents within a collection of text documents that include either a matching key term, related term, or variation thereof from a particular topic cluster. For instance, if a topic cluster has the key term "trustworthy" and related terms "honest," "truthful,"

"authentic," "polite," and "positive," then the cluster-matched documents are text documents that include at least one of these terms from the topic cluster.

Upon determining a correlation between topic clusters and text documents, the content management system can then associate cluster-matched documents with their corresponding topic cluster. For instance, the content management system tags a text document with each topic cluster that has a term within the text document. Alternatively, the content management system generates a table that lists each topic cluster and corresponding text documents (or vice-versa—a list of text documents and corresponding topic clusters).

As part of organizing topic clusters, in one or more embodiments, the content management system also matches (i.e., locates) and emphasizes terms within a cluster-matched document that belongs to the topic cluster. For example, the content management system highlights, bolds, italicizes, and/or underlines matched terms in a text document. In another example, the content management system changes the text color of each matched term. In some embodiments, the content management system highlights (or changes the text color of) matched terms from a first topic cluster within a text document with a first color and highlights matched terms from a second topic cluster within the text document with a second color.

Organizing text documents by topic cluster, in various embodiments, includes prioritizing cluster-matched documents for a topic cluster. The content management system can prioritize text documents within a group of cluster-matched documents using various methods or techniques. As one example, the content management system prioritizes cluster-matched documents based on the number of matched terms (e.g., unique matched terms or total matched words including repeat matches) from the topic cluster in each text document. For instance, the content management system prioritizes a text document that includes five matching terms from the topic cluster over a text document that includes three matching terms.

As another example, the content management system prioritizes cluster-matched documents based on the relevance. For instance, text documents from the cluster-matched documents with the key term are prioritized over text documents with related terms. Further, the related terms in the cluster can be prioritized based on distance of the related term to the key term in the vector mapping.

In additional embodiments, the content management system prioritizes cluster-matched documents based on the frequency percentage of matched terms. For instance, the content management system determines the number of matched words relative to the total number of words (including or excluding stop words) in a text document. In some examples, the content management system prioritizes cluster-matched documents based on the length of each text document, with short text documents prioritized over longer text documents (or vice-versa). Further, in some embodiments, the content management system organizes cluster-matched documents using multiple prioritization methods or techniques to create a tiered prioritization scheme.

As FIG. 3B illustrates the content management system provides 322 text documents organized by topic cluster. Generally, the content management system provides the organized text documents to a client device (e.g., an administrator client device), which presents the organized text documents to a user (e.g., an administrator). In some embodiments, however, the content management system resides on a client device and directly provides or presents the organized text documents to a user. As discussed above, in many embodiments, the content management system provides the organized text documents to a user through a graphical user interface.

The user can interact with the graphical user interface to provide user input to the content management system. For example, the user provides user input requesting the content management system modify (add, remove, edit, etc.) a topic cluster (called a modification request). As a note, in embodiments where the content management system is located on a server device and the organized text documents are presented to a user on a client device, the client device receives user input from the user and provides indications of the user input to the content management system. Alternatively, in embodiments where the content management system is located on a client device, the content management system can directly receive input from the user. Regardless of which embodiment employed, the content management system receives (indirectly or directly) user input and performs additional actions in response to the user input, as explained below.

For example, FIG. 3B illustrates that the content management system receives 324 a topic cluster modification request. In or more instances, the modification request includes a request to add or remove a related term from a topic cluster. In some instances, the modification request includes a request to merge or split topic clusters. In other instances, the modification request includes a request to add additional topic clusters.

Based on the received modification request, the content management system redefines 326 one or more topic clusters. As mentioned above, the content management system can use a key terms count (e.g., N), a similarity threshold (e.g., A), and a minimum significance value threshold (e.g., B) to determine related terms and generate topic clusters. Accordingly, based on the modification request, the content management system modifies one or more of the parameters N, A, and B. In one example, the content management system globally increases the similarity threshold (e.g., A) for all topic clusters to add one or more related terms to each topic cluster. In another example, the content management system decreases the minimum significance value threshold (e.g., B) for a particular topic cluster.

Alternatively, the content management system redefines a topic cluster without adjusting the above-mention parameters. For instance, the content management system applies user input manually adding (or removing) a topic cluster from the presented topic clusters, or the content management system manually adds a related term from a topic cluster.

Upon redefining one or more topic clusters based on the modification request, the content management system reorganizes 328 the text documents based on the redefined topic clusters. Upon updating one or more topic clusters based on the user-requested modifications, the content management system reorganizes the text documents. For example, the content management system updates the table that associates each topic cluster with cluster-matched documents. In another example, the content management system updates the prioritization within each set of cluster-matched documents.

The content management system then provides 330 the reorganized text documents. For example, the content management system provides the reorganized text documents directly to a user displayed in a presentation. Alternatively, the content management system provides a presentation of the reorganized text documents to a client device, which provides the presentation to the user. Providing the presentation of reorganized text documents can include modifying the existing presentation to reflect any changes that occurred as a result of reorganizing the text documents based on the redefined topic clusters. Examples of modifying a presentation of topic clusters and text documents are described and shown below.

The content management system can repeat the actions of receiving 324 a topic cluster modification request, redefining 326 topic clusters based on the request, reorganizing 328 the text documents, and providing 330 the reorganized text documents, as shown by dashed line 332 in FIG. 3B. Accordingly, the content management system enables a user to request one or more topic cluster modifications, and in response, the content management system performs the modification requests. Further, based on how topic clusters are formed and implemented, the content management system can provide the results of the modification requests to the user in real-time or near real-time. In other words, based on the efficient analysis of the content management system, the modified topic clusters and reorganization of text documents, as presented in the graphical user interface, can appear seamless from the perspective of a user.

As mentioned above, the content management system generates a vector mapping of word vectors (e.g., term vector) as part of determining related terms and generating topic clusters for a collection of text documents. FIGS. 4A, 5A, 6A, 7A, 8A, 9A, and 10A each illustrate an example vector mappings of terms from a collection of text documents. While vector mappings can include hundreds of dimensions, these figures provide a simplified two-dimension vector space for purposes of explanation, but in practice, the vector space can be expanded to n-dimensions.

Further, while FIGS. 4A, 5A, 6A, 7A, 8A, 9A, and 10A focus on using vector space to determine related terms, one will appreciate that the content management system can use other approaches to sort and organize terms in the collection to identify related terms. For instance, the content management system can employ a connectivity model (e.g., hierarchical clustering based on distance connectivity), a centroid model (e.g., k-means), a distribution model, a density model, a subspace model, a group model, a graph-based model to identify related terms as part of generating topic clusters, and/or a combination of a vector space model and one or more of the above-mentioned models.

Figure 4A:
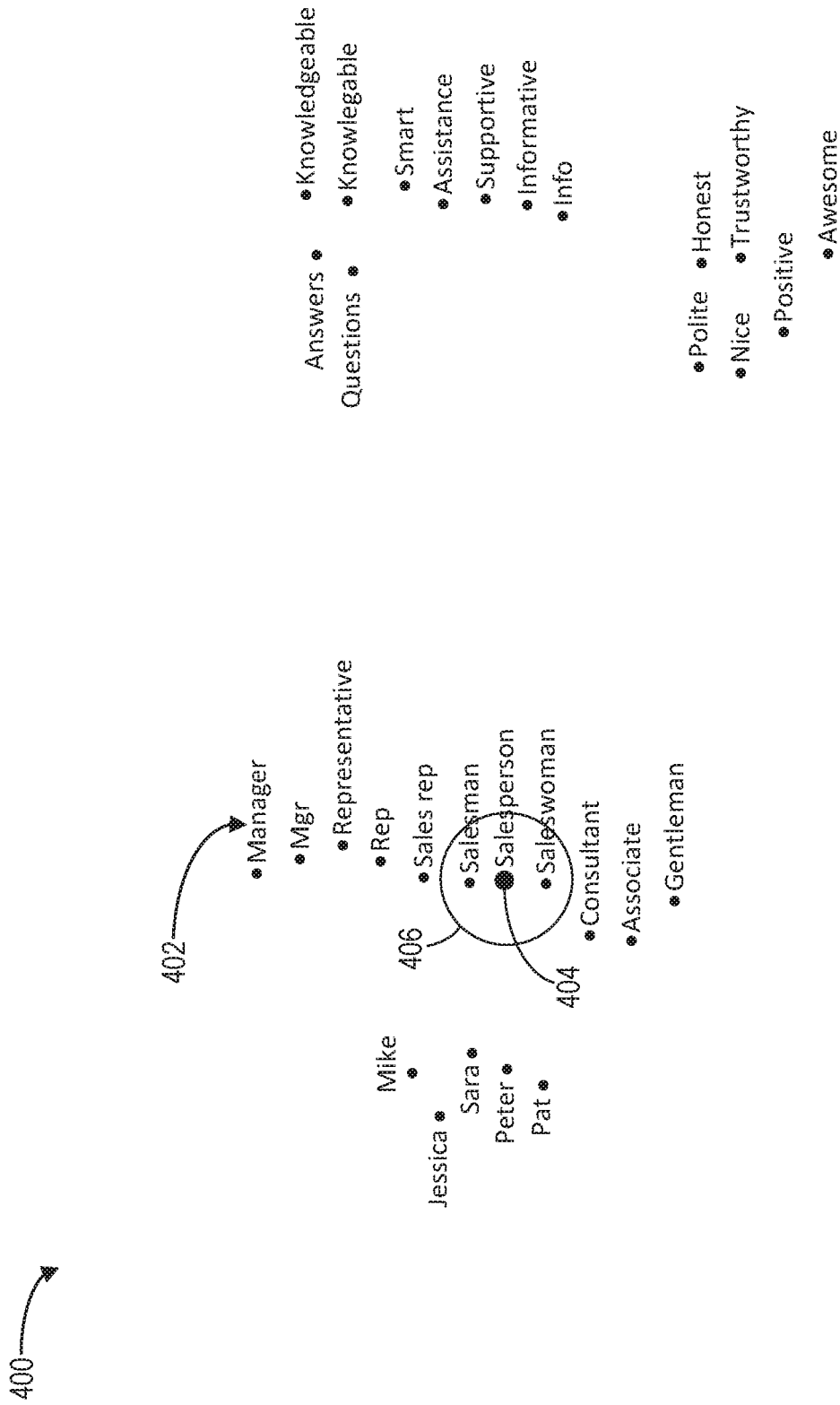
FIG. 4A illustrates an example vector mapping of a key term and related terms in accordance with one or more embodiments described herein.

FIG. 4A shows an example vector mapping 400 of a key term and related terms. In particular, FIG. 4A illustrates a vector mapping showing terms 402 from a collection of text documents. For example, the text documents could relate to customer feedback at a car dealership. One will appreciate that the terms 402 include a sampling of terms and that the collection of text documents can include additional terms not shown.

In addition, the terms listed in the vector mapping 400 are merely representative. For example, the term "Salesperson" can have a large number variations, include style, spelling (including incorrect spelling), punctuation, and capitalization. For instance, as a non-exhausted list, variations include: salesperson, sales person, Sales person, sales Person, sales persons, SAlesperson, saleperson, salespersons, sales[erson, sales persen, slaesperson, and salespreon. In general, each of these variations are located near each other in the vector space based on the similar context within which each of the terms appear (e.g., see "Knowledgeable" and "Knowlegable" in the vector mapping 400), however, the actual location may differ depending on the specific frequency and particular context in which each variation is used in a collection of text documents.

As shown in FIG. 4A, the content management system locates each term within the vector mapping 400 based on the term's word vector. As described above, the content management system generally locates related terms in groups (e.g., clusters). For example, as shown, the vector mapping includes various clusters of terms 402. In addition, the vector mapping 400 also locates correlated terms near each other. For instance, based on the positioning of terms 402, the vector mapping 400 indicates that Mike is a manager while Sara and Peter are in sales.

In addition, FIG. 4A illustrates a key term 404 (e.g., "Salesperson"). As described above, the content management system can identify a key term based on the term's significance value and locate the key term 404 within the vector mapping 400. After locating the key term 404, the content management system determines one or more related terms to associate with the key term 404.

In some embodiments, the content management system associates terms located within a similarity threshold (e.g., A) of the key term 404. To illustrate, the vector mapping 400 includes an example similarity threshold 406. While the similarity threshold 406 is represented as a circle for purposes of explanation, the content management system may employ other shapes, particularly in n-dimensional vector space. Further, the selected key term need not be at the center of the similarity threshold 406, as shown below in FIGS. 7A and 8A.

The similarity threshold 406, in one or more embodiments, includes one or more terms within a threshold distance from the key term 404. As shown, the terms "Salesman" and "Saleswoman" are included in the similarity threshold 406. As such, the content management system determines that these terms are related to the key term 404.

Using the key term 404 and the related terms (e.g., terms within the similarity threshold 406), the content management system generates a topic cluster as described above. For example, the content management system can create a topic cluster that is labeled "Salesperson" and includes the related terms "Salesman" and "Saleswoman."

Figure 4B:
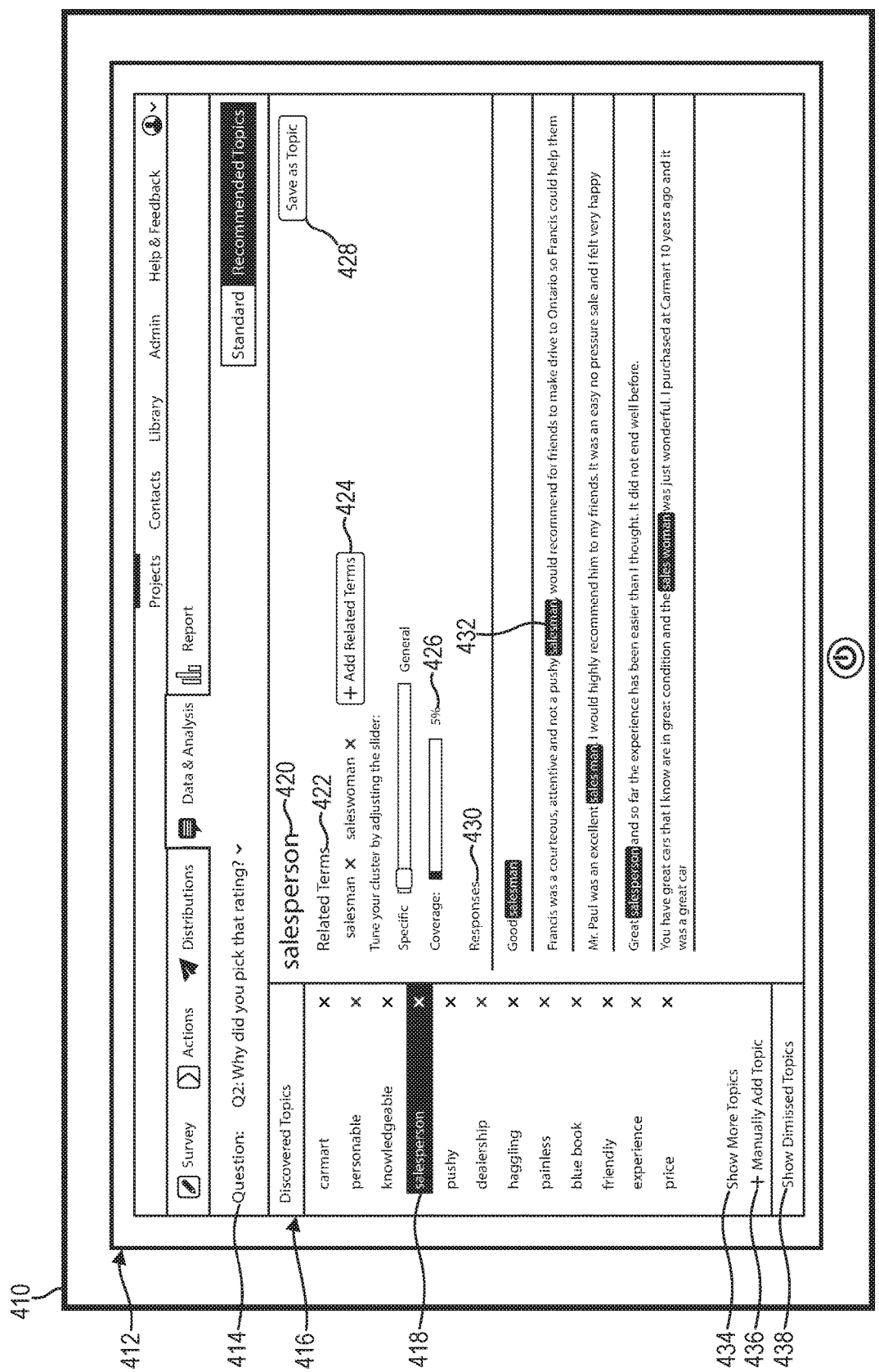
FIG. 4B illustrates an example graphical user interface that displays a topic cluster (corresponding to FIG. 4A) and related electronic text documents in accordance with one or more embodiments described herein.

As described above, the content management system presents the topic cluster to a user as a recommended topic cluster. To illustrate, FIG. 4B shows a client device 410 that includes a graphical user interface 412 that displays a list of topic clusters and one or more text documents. In particular, the graphical user interface 412 relates to the vector mapping 400 shown in FIG. 4A.

The graphical user interface 412 includes a number of components and elements. For example, the graphical user interface 412 shows a question or prompt 414 to which the text documents correspond (e.g., feedback at a car dealership). The graphical user interface 412 also shows a list 416 of topics corresponding to topic clusters generated by the content management system with respect to the collection of documents. In particular, the list 416 of topic clusters includes a selected topic cluster 418. The list 416 of topics can be organized based on significance values of the key term within the topic cluster, number of cluster-matched documents, or another order. In addition, the list 416 of topic clusters can be organized in alphabetical order, relevance order, or ordered manually by a user or by any number of ordering criteria.

The list 416 of topics also includes additional selectable elements, such as a more-topics element 434 (e.g., "Show More Topics"), an add-topics element 436 (e.g., "Manually Add Topics"), and a dismissed-topics element 438 (e.g., "Show Dismissed Topics"). The more-topics element 434 causes the list 416 of topic clusters to expand and reveal additional topics. More specifically, in response to receiving user input that the user selected the more-topics element 434, the content management system generates one or more additional topic clusters, as described above, and provides the additional topic clusters to the client device 410 to display to the user. For example, the content management system generates a topic cluster using the key term with the next significance value that is not already included in a topic cluster.

The add-topics element 436, in some embodiments, causes the content management system to generate a new topic cluster based on user input. For example, upon a user selecting the add-topics element 436, the client device 410 enables the user to input a term to be added to the list 416 of topics, which the client device 410 sends to the content management system. In response, the content management system can assign the term as a key term, locate the term within the vector mapping, determine one or more related terms, and generate a new topic cluster based on the user-provided term, as described above.

In cases where the content management system determines that one or more related terms from the newly-created topic cluster belong to another topic cluster, the content management system can prioritize the key term provided by the user over other key terms (e.g., if mutual exclusivity of related terms is enforced, assign the related terms in question to the topic cluster requested by the user). Then, the content management system can update the remaining topic clusters, as described previously. Finally, the content management system can provide, via the client device 410, the updated topic clusters with the newly added topic cluster to the user as well as reorganized text documents.

The dismissed-topics element 438, in one or more embodiments, causes the content management system to reveal one or more dismissed topic clusters. As background, as shown in the list 416 of topic clusters, each topic cluster includes a selectable option (e.g., "x") to remove the topic cluster from the list. When the content management system receives (e.g., via the client device 410) user input removing a topic cluster, the content management system can hide the topic cluster and the related terms from the list of topic clusters.

In some embodiments, when the content management system removes the key term in response to user input, the content management system can reassign a related term to another topic cluster, if the related term is within the similarity threshold of another topic cluster. Further, in some cases, the content management system creates an additional topic cluster from a related term from the removed topic cluster that otherwise would have been a key term when the content management system initially generated topic clusters. Then, as described above, the content management system can redefine the topic clusters, reorganize the text documents, and provide the modifications to the user via the client device 410.

When the content management system detects that a user selects the dismissed-topics element 438 (e.g., "Show Dismissed Topics"), the content management system reveals topic clusters previously removed or dismissed by the user. Further, the content management system may also reveal an option to restore the dismissed topic cluster. Upon detecting user input requesting that a dismissed topic be re-sorted, the content management system can restore the dismissed topic cluster to the list 416 of topic clusters. Further, the content management system can restore or re-determine related terms for a topic cluster.

As shown in FIG. 4B, the graphical user interface 412 shows a selected topic cluster 418 within the list 416 of topics. The selected topic cluster 418 represents the generated topic cluster described in connection with FIG. 4A. For example, the user selects the selected topic cluster 418 and the client device 410 provides an indication of the selection to the content management system. Upon receiving the user selection of the selected topic cluster 418, the content management system updates the graphical user interface 412 to display a key term 420 (e.g., "salesperson") and related terms 422 (e.g., "salesman" and "saleswomen") corresponding to the selected topic cluster 418.

Further, the graphical user interface 412 updates to display cluster-matched documents 430 (e.g., responses) that correspond to selected topic cluster 418. As shown, the cluster-matched documents 430 emphasize (e.g., highlight) matched terms 432 from the selected topic cluster 418 (e.g., from the key term 420 or related terms 422) within each of the cluster-matched documents 430. In some embodiments, the graphical user interface 412 displays portions of a text document in the cluster-matched documents 430. For instance, the graphical user interface 412 displays a portion of a text document that includes one or more matched terms 432 from the selected topic cluster 418.

In one or more embodiments, such as the embodiment illustrated in FIG. 4B, the graphical user interface 412 includes one or more selectable elements that enable a user to request a modification to a topic cluster, and in particular, modifications to the related terms in a topic cluster. For example, the graphical user interface 412 includes an add-terms element 424 (e.g., "Add Related Terms") that enables a user to request additional related terms to the selected topic cluster 418.

Upon receiving a selection indication of the add-terms element 424, the content management system expands the similarity threshold (e.g., A) of the selected topic cluster 418. For instance, the content management system expands the similarity threshold until at least one additional term is added as a related term. Alternatively, the content management system can relax the minimum significance value threshold (e.g., B) to obtain additional related terms for the selected topic cluster 418. An example of expanding the similarity threshold is provided in FIGS. 5A and 5B.

In some embodiments, upon receiving a selection of the add-terms element 424, the client device 410 enables the user to manually add a related term to the selected topic cluster 418. Upon receiving user input with the new term, the content management system adds the new term to the selected topic cluster 418 as a related term 422. In addition, the content management system updates the cluster-matched documents 430, as described above, to include any text documents that contain the new related term. Further, if mutually exclusive related terms is enforced, the content management system can remove the term to another topic cluster to which the term may have previously belonged.

Also, as shown in FIG. 4B, the graphical user interface includes a coverage graphic 426 that provides a visual indication of the coverage of the related terms. For example, the coverage graphic 426 indicates the percentage of text documents in the collection of text documents that are shown in the cluster-matched documents 430. In an alternative embodiment, the coverage graphic 426 indicates the percentage of total terms that are assigned to the topic cluster. While the coverage graphic 426 illustrates a percentage, one will appreciate that the content management system can display other metrics.

FIG. 4B also includes a save option 428 (e.g., "Save as Topic"). In one or more embodiments, the content management system provides the save option 428 to enable a user to request the content management system to save the topic cluster for future reporting. For example, upon receiving an indication that the user selected the save option 428, the content management system tags (e.g., in metadata) the corresponding collection of text documents with the key term 420 and/or related terms 422.

Similarly, in one or more embodiments, the content management system tags a text document with the key term 420, related terms 422, and/or topic clusters associated with the text document. In some embodiments, the content management system enables a user to view and modify (e.g., add, remove, change) tags assigned to one or more text documents. For example, the content management system displays an interactive list of tags associated with text document to a user.

In one or more embodiments, tags (or labels) can assist a user in performing future text document searches. For example, the content marketing system or an outside system uses tags from one or more collection of text documents to compile reports that indicate the usage, frequency, and/or density of tags among the one or more collection of text documents. As another example, the content marketing system provides a user with a report indicating statistics for a collection of text documents for one or more tags.

As mentioned above, FIG. 5A illustrates a vector mapping 400 of a topic cluster having expanded related terms. The vector mapping 400 is the same vector mapping introduced in FIG. 4A. For example, the vector mapping 400 shows terms 402 from a collection of text documents. Further, the content management system identifies and locates a key term 404 within the vector mapping 400. As described above, the content management system can increase the size of the similarity threshold (e.g., A) to include additional related terms to associate with the key term 404 as part of generating a topic cluster. For example, the content management system expands the similarity threshold in response to a modification request to add additional related terms to the topic cluster.

As shown, the expanded similarity threshold 506 has a larger radius than the previous similarity threshold 406 shown in FIG. 4A. Accordingly, the larger expanded similarity threshold 506 includes additional terms over the previous similarity threshold 406. Specifically, the expanded similarity threshold 506 includes eight additional terms that the content management system associates with the key term 404 as part of a topic cluster. The content management system can increase the similarity threshold based on a variety of factors (e.g., by x percent, x-units, x terms).

Figure 5A:
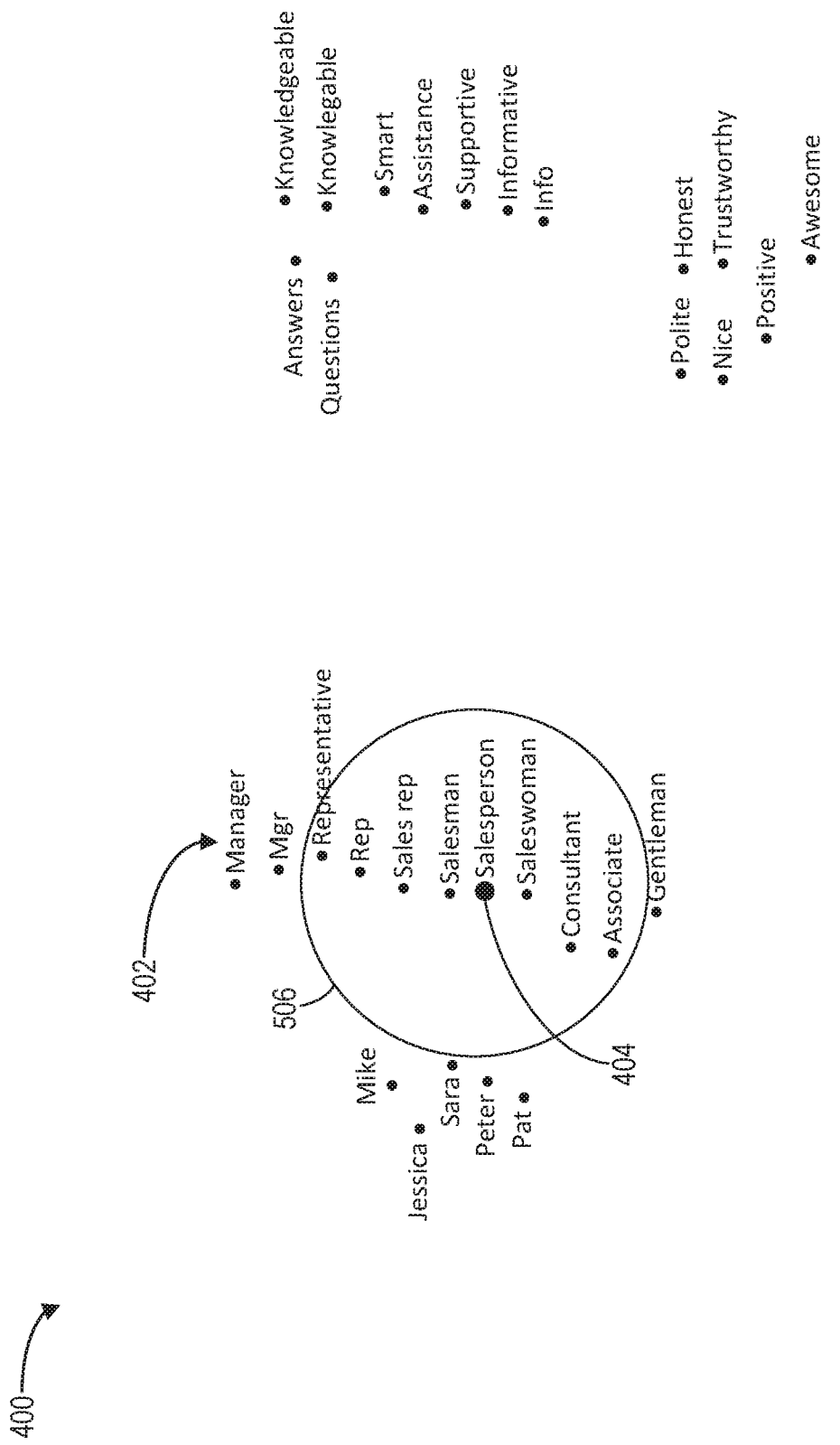
FIG. 5A illustrates an example vector mapping of a topic cluster having expanded related terms in accordance with one or more embodiments described herein.
Figure 5B:
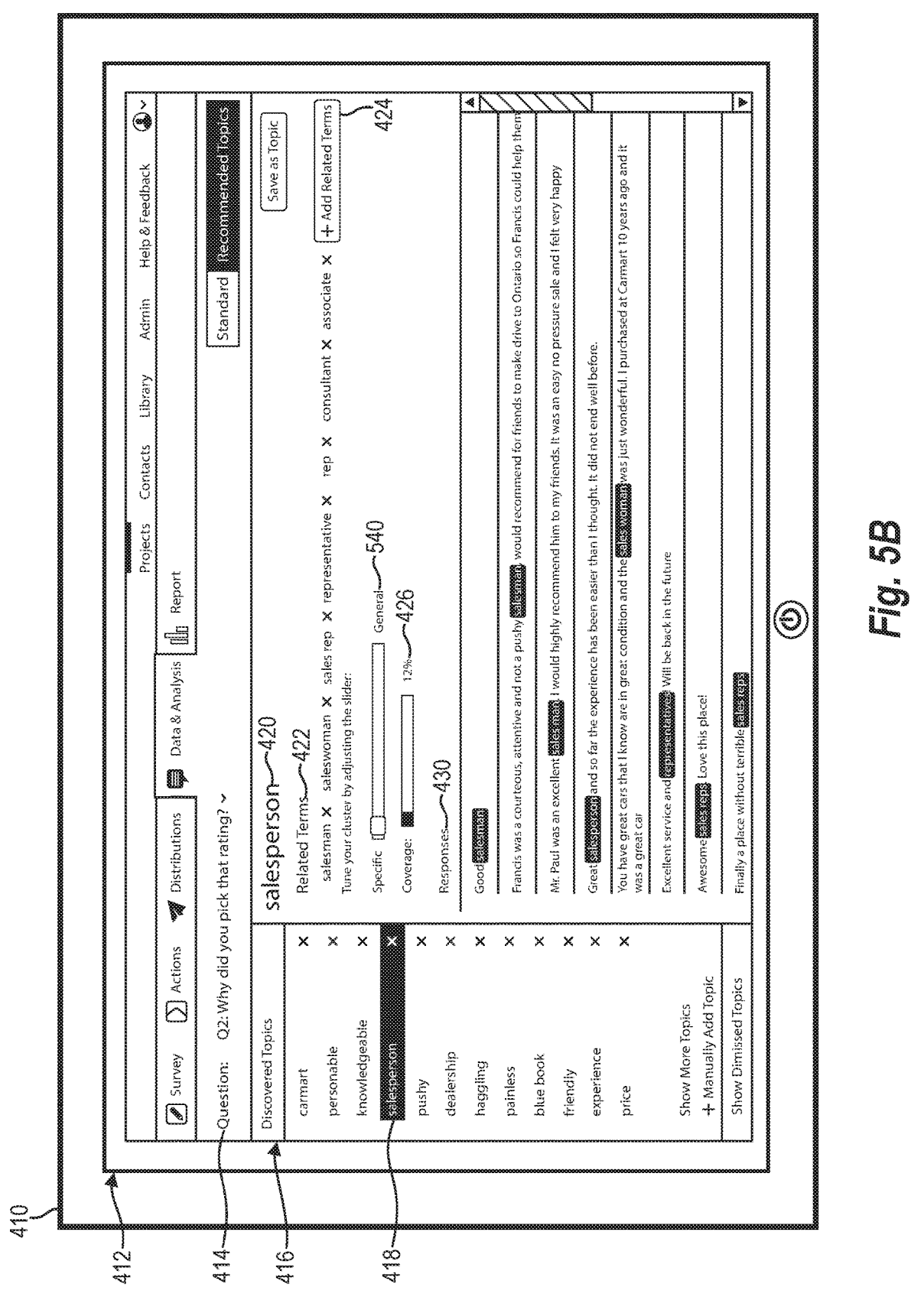

FIG. 5B illustrates the client device 410 and the graphical user interface 412 introduced above. The client device 410 that includes the graphical user interface 412 shown in FIG. 5B can also correspond to the client device 410 and graphical user interface 412 shown in FIG. 4B. The graphical user interface 412 in FIG. 5B updates to display an expanded topic cluster corresponding to FIG. 5A. For example, as shown, the related terms 422 updates to include the additional terms located in the expanded similarity threshold 506.

Further, the content management system updates the graphical user interface 412 to display additional cluster-matched documents 430 based on the terms added to the related terms 422. For example, the content management system determines that the term "representative" should be added to the selected topic cluster 418 upon expanding the similarity threshold. As such, the cluster-matched documents 430 include any responses that use the term "representative."

Along with the additional related terms added to the selected topic cluster 418, the graphical user interface 412 displays an updated coverage graphic 426. As shown, the coverage graphic 426 shows an increase from 5% to 12% based on the content management system expanding the similarity threshold and adding additional terms to the selected topic cluster 418. As mentioned above, the coverage graphic 426 can indicate the percentage of text documents in the collection of text documents that are included in the cluster-matched documents 430.

In addition to adding terms by using the add-terms element 424, in some embodiments, the content management system provides additional methods for the user to add or remove related terms 422 from the selected topic cluster 418. For example, in the illustrated embodiment, the graphical user interface 412 includes a slider element 540. The slider element 540 allows a user to quickly modify the range of the selected topic cluster 418 from specific (e.g., few related terms 422) to general (e.g., many related terms 422).

Figure 5C:
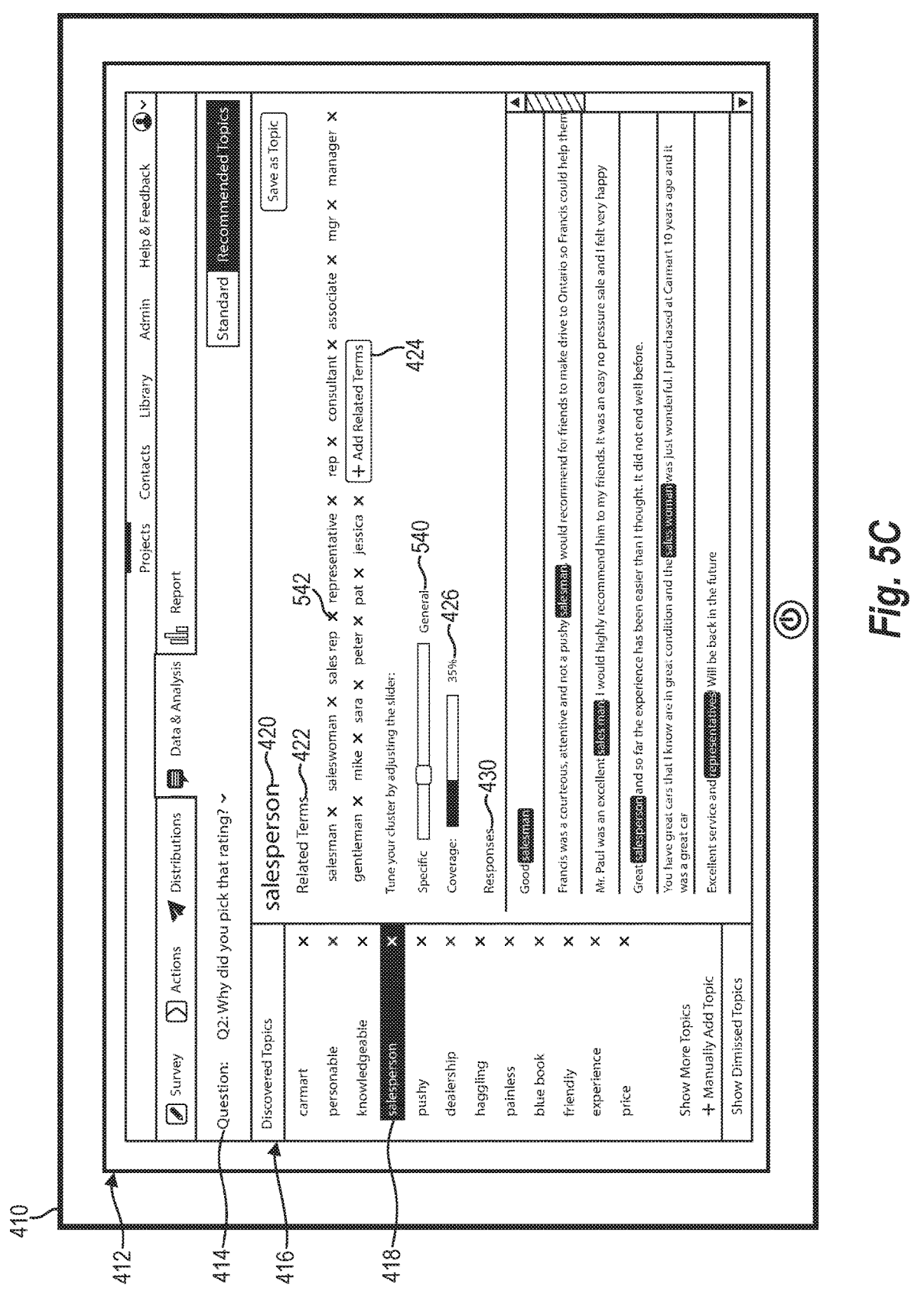

To illustrate, FIG. 5C illustrates the result of a user moving the slider element 540 toward the general range. The graphical user interface displays even more related terms 422 (e.g., fifteen total related terms). Further, the coverage graphic 426 shows an increase from 12% to 35%. Also, the content management system provides additional text documents to the cluster-matched documents 430 (e.g., shown by the size of the scroll bar element decreasing from FIG. 5B to FIG. 5C, which indicates that the content management system has added additional text documents to the cluster-matched documents 430.

In some embodiments, particularly after adding related terms 422 to a selected topic cluster 418, a user desires to remove one or more related terms 422. Accordingly, the content management system enables the user to selectively remove one or more related terms 422. To illustrate, FIG. 5C shows a removal element 542 for each related term. Upon receiving an indication that the user selected the removal element, the content management system disassociates the corresponding related term. Further, the content management system removes any text documents from the cluster-matched documents 430 that include the removed related term (and does not include any other term from the selected topic cluster 418).

In some embodiments, the content management system removes more than one related term upon a user selecting the removal element 542 for one or more related terms. For example, the content management system detects an indication (e.g., modification request) to remove the related term of "Sara." In response, the content management system determines if it should remove additional related terms from the selected topic cluster 418. For instance, the content management system determines whether to also remove one or more of the additional terms are adjacent to the related term (e.g., in a vector mapping). This concept is illustrated in FIGS. 6A and 6B below.

Figure 6A:
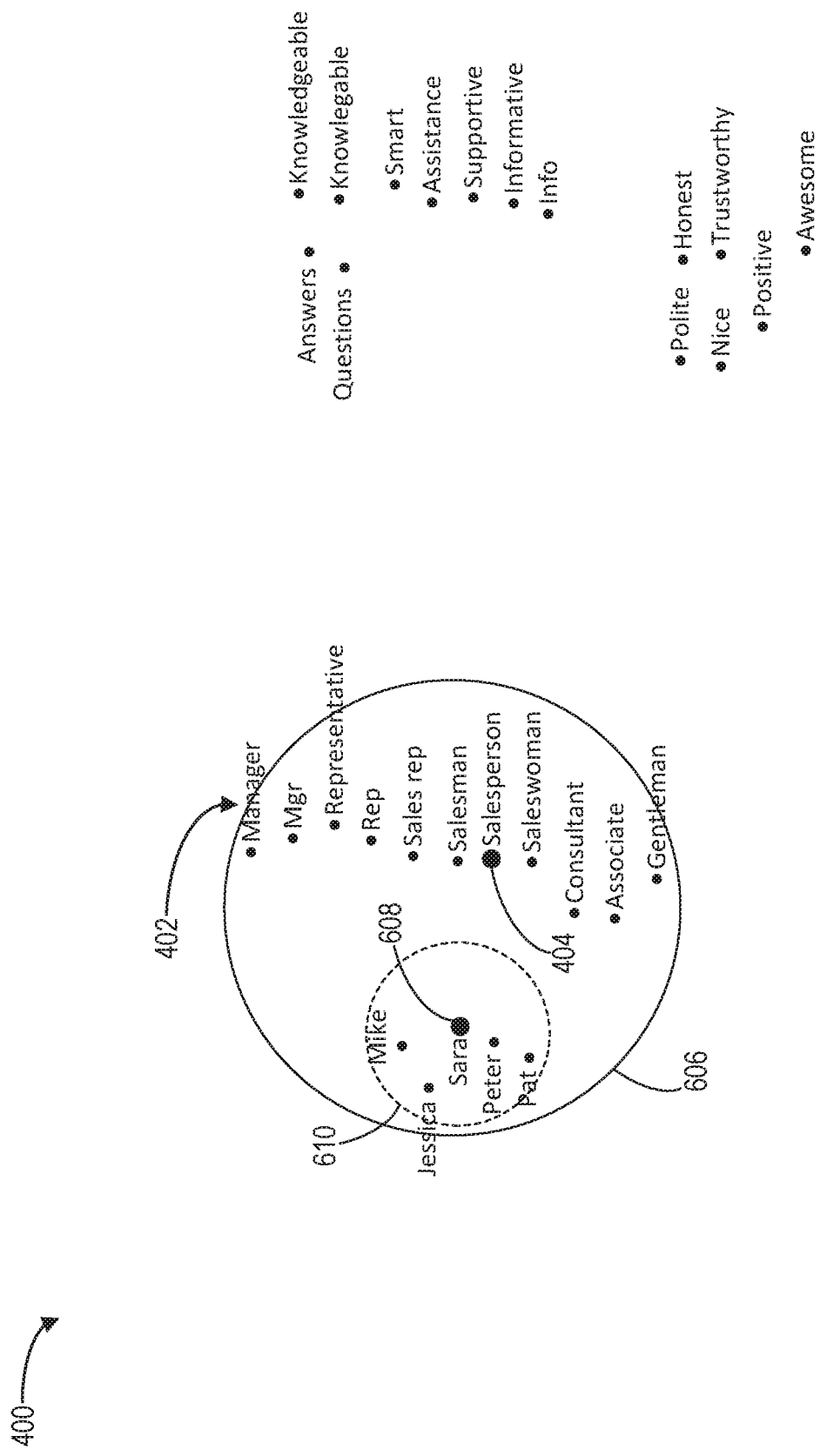
FIG. 6A illustrates an example vector mapping of a topic cluster with excluded terms in accordance with one or more embodiments described herein.
Figure 6B:
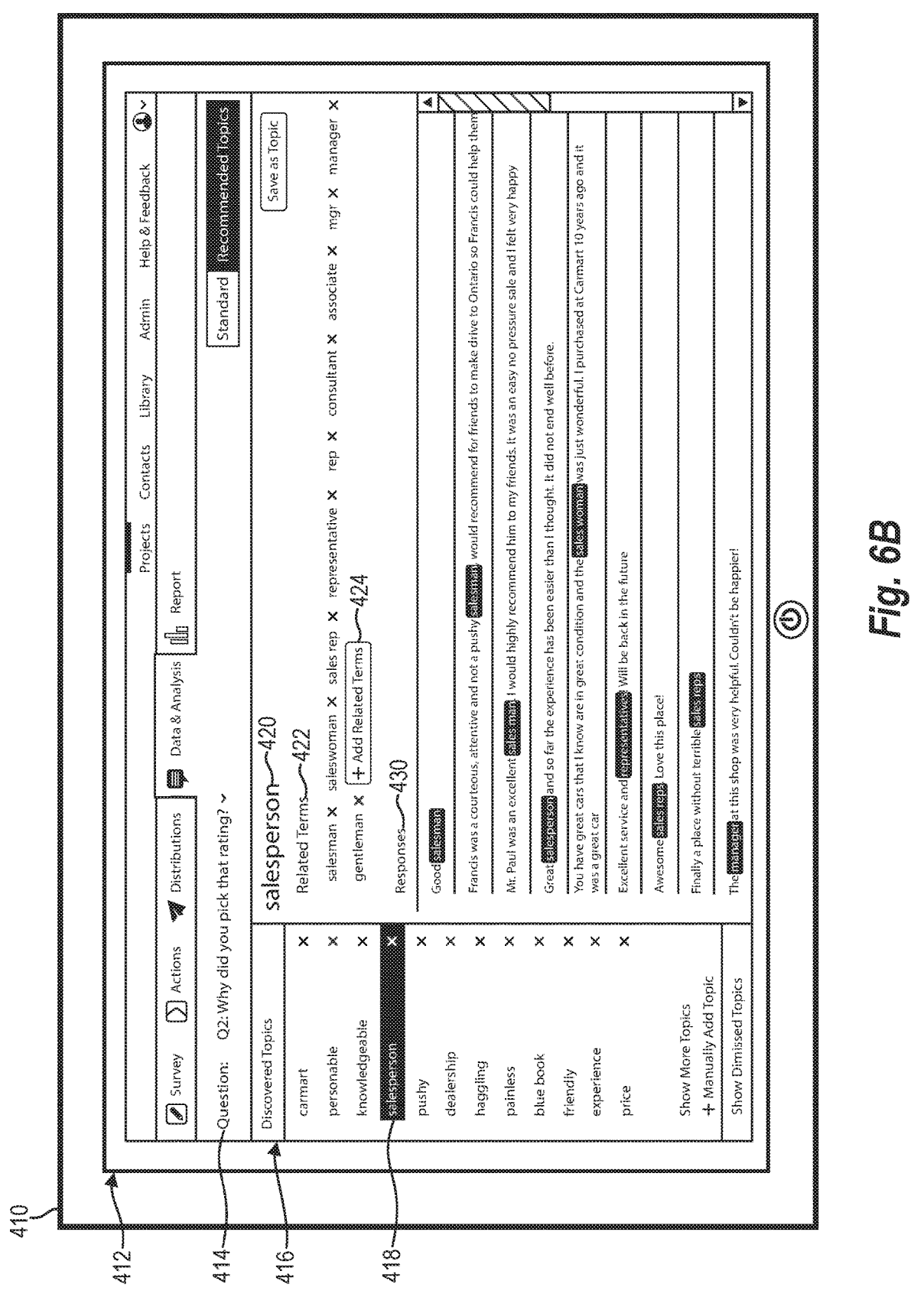

FIG. 6A illustrates a vector mapping 400 of a topic cluster with excluded terms. The vector mapping 400 is the same vector mapping introduced in FIG. 4A. For example, the vector mapping 400 shows terms 402 from a collection of text documents. The vector mapping 400 also includes the key term 404 selected by the content management system, as described above. In addition, the vector mapping 400 includes a similarity threshold 606 that reflects the expanded topic cluster shown in FIG. 5C. For example, as mentioned above with respect to FIG. 5C, the content management system further expanded the similarity threshold of the selected topic element to include a total of fifteen related terms based on user input received in a modification request.

As also shown in FIG. 6A, the content management system identifies the removed term 608. Further, as mentioned above, the content management system determines if one or more of the additional terms are adjacent to the related term to be removed. In one or more embodiments, the content management system employs a negative similarity threshold 610 with respect to the removed term 608 to determine other terms to remove from a selected topic cluster. The content management system can determine the negative similarity threshold 610 in a similar manner as described above with respect to the similarity threshold 606. For example, the negative similarity threshold 610 can be any polygonal or n-dimensional shape.

As shown, the content management system identifies four additional terms that reside within the negative similarity threshold 610. According, upon receiving an indication to remove the removed term 608 (e.g., "Sara") for a topic cluster, the content management system also automatically removes the additional terms of "Mike," "Jessica," "Peter," and "Pat." Thus, the content management system actively assists the user in modifying a topic cluster based on the user's intent. Alternatively, in some embodiments, the content management system prompts the user whether he or she would like the content management system to remove additional related terms corresponding to the removed term 608 before removing all terms within the negative similarity threshold 610 from a selected topic cluster.

While the majority of embodiments describe a user interacting with a graphical user interface to request modifications to one or more topic clusters, in some embodiments, the content management system displays the vector space or a representation of the vector space to the user and enables the user to modify terms directly in the vector space. For example, in some instances, the content management system enables the user to increase or decrease the radius of a similarity threshold directly. In other instances, the user directly selects and deselects terms to include along with a key term as part of a topic cluster. In some instances, the user manually sets the boundaries of a similarity threshold (e.g., draws a polygon around included terms).

Further, one will appreciate that the content management system can display other representations to the user to assist the user in selecting related terms. For instance, the content management system displays a word cloud where the size and/or position of each term in the word cloud corresponds to its relation to the key term and/or other terms in the collection. In some embodiments, the terms in the word cloud are influenced by their significance values. For example, the content management system filters out terms in the word cloud that do not satisfy the minimum significance value threshold (e.g., B).

FIG. 6B illustrates the client device 410 and the graphical user interface 412 introduced above. The graphical user interface 412 in FIG. 6B updates to display a modified topic cluster corresponding to FIG. 6A. For example, as shown, the related terms 422 no longer include the terms within the negative similarity threshold. Further, the text documents in the cluster-matched documents 430 no longer display responses with the terms "Sara," "Mike," "Jessica," "Peter," and "Pat," unless the text documents also include another term from the selected topic cluster 418. In any case, the content management system does not emphasize these removed terms when they appear in the cluster-matched documents 430.

As a note, the graphical user interface 412 in FIG. 6B does not include the slider element or the coverage graphic. One will appreciate that the content management system can include or exclude these and other elements within the graphical user interface 412. Further, the content management system can rearrange the layout of elements and components in the graphical user interface 412. For example, the content management system provides the client device 410 with a graphical user interface 412 that displays the list 416 of topic clusters on the right side or displayed horizontally near the top of the graphical user interface 412. In another example, the content management system makes the display of the key term 420 and related terms 422 collapsible to enable a user to view additional cluster-matched documents within the graphical user interface 412.

Figure 7A:
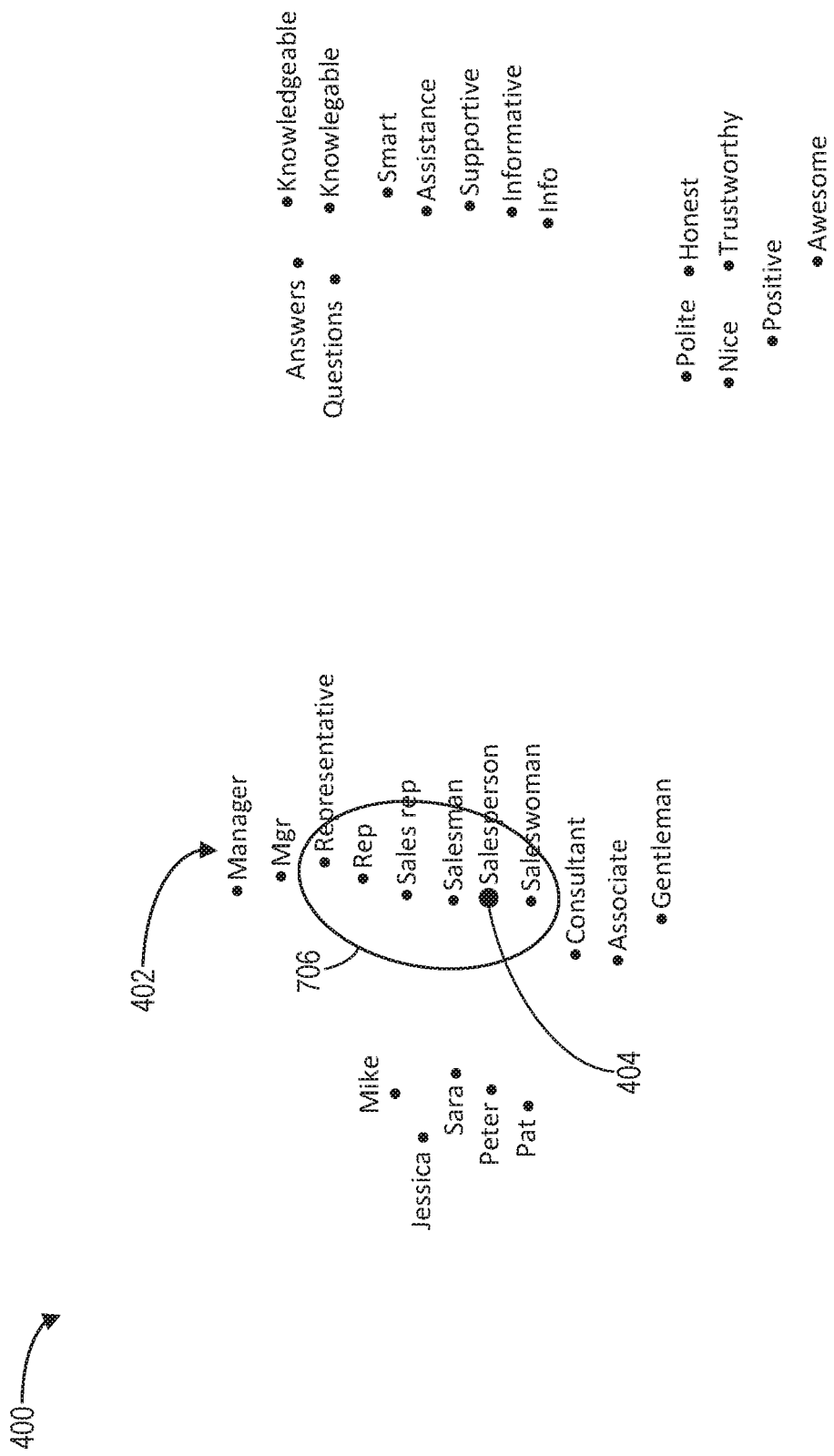
FIG. 7A illustrates an example vector mapping of a modified topic cluster in accordance with one or more embodiments described herein.
Figure 7B:
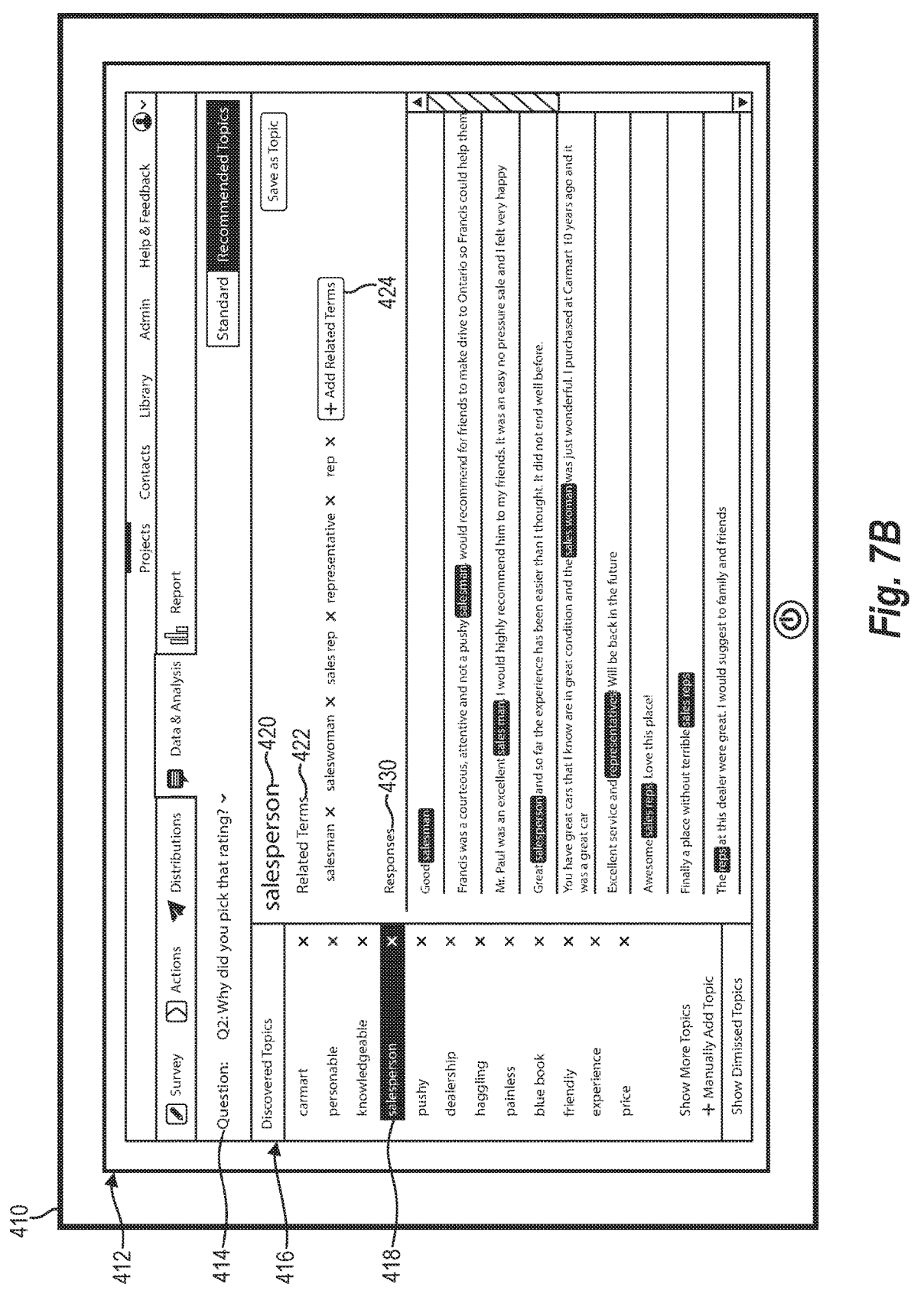

As described above, the content management system can intelligently determine to remove one or more additional related terms from a topic cluster when the user requests to remove a related term. Similarly, using machine learning and/or statistical analysis, the content management system also intelligently learns a user's intent as the content management system receives various modification requests from a user to modify (e.g., add or remove related terms) from a selected topic cluster. FIGS. 7A and 7B illustrate this concept.

FIG. 7A illustrates a vector mapping 400 of a modified topic cluster. The vector mapping 400 is the same vector mapping introduced in FIG. 4A. For example, the vector mapping 400 shows terms 402 from a collection of text documents. The vector mapping 400 also includes the key term 404 selected by the content management system, as described above.

In particular, as shown in FIG. 7A, the content management system shows a modified topic cluster based on a modification requested from a user. For example, the content management system initially presents the user with a topic cluster that included the key term 404 of "Salesman" and the related terms of "Salesman" and "Saleswoman" (see FIG. 4A). Next, the content management system receives a modification request to add additional related terms, and in response, the content management system adds the terms "Representative," "Rep," "Sales representative," "Consultant," and "Associate" to the topic cluster (see FIG. 5A). Further, the content management system receives a modification request to remove the terms "Consultant" and "Associate" from the topic cluster, which results in the modified similarity threshold 706 shown in FIG. 6A.

As shown, the modified similarity threshold 706 is shaped based on the user's modification request. For example, the content management system uses machine learning and/or statistical analysis to determine how to redefine, update, or modify the topic cluster. In particular, the content management system can apply machine learning and/or statistical analysis to past user interactions, behaviors, and selections to intelligently infer related terms when redefining/updating clusters. For instance, when updating or creating a topic cluster, the content management system considers factors such as related terms that the user has accepted, seen, and/or rejected as well as terms manually inputted by the user. In this manner, the content management system can refine and tune topic clusters such that the content management system more accurately identifies a respondent's intent behind a survey response while also capitalizing on a user's expert knowledge FIG. 7B illustrates the client device 410 and the graphical user interface 412 introduced above. The graphical user interface 412 in FIG. 7B updates to display the modified topic cluster corresponding to FIG. 7A. As shown, the related terms 422 include the terms within the modified similarity threshold of the selected topic cluster 418. The content management system updates the topic clusters and reorganizes the text documents in the cluster-matched documents 430 based on the modified topic cluster.

Figure 8A:
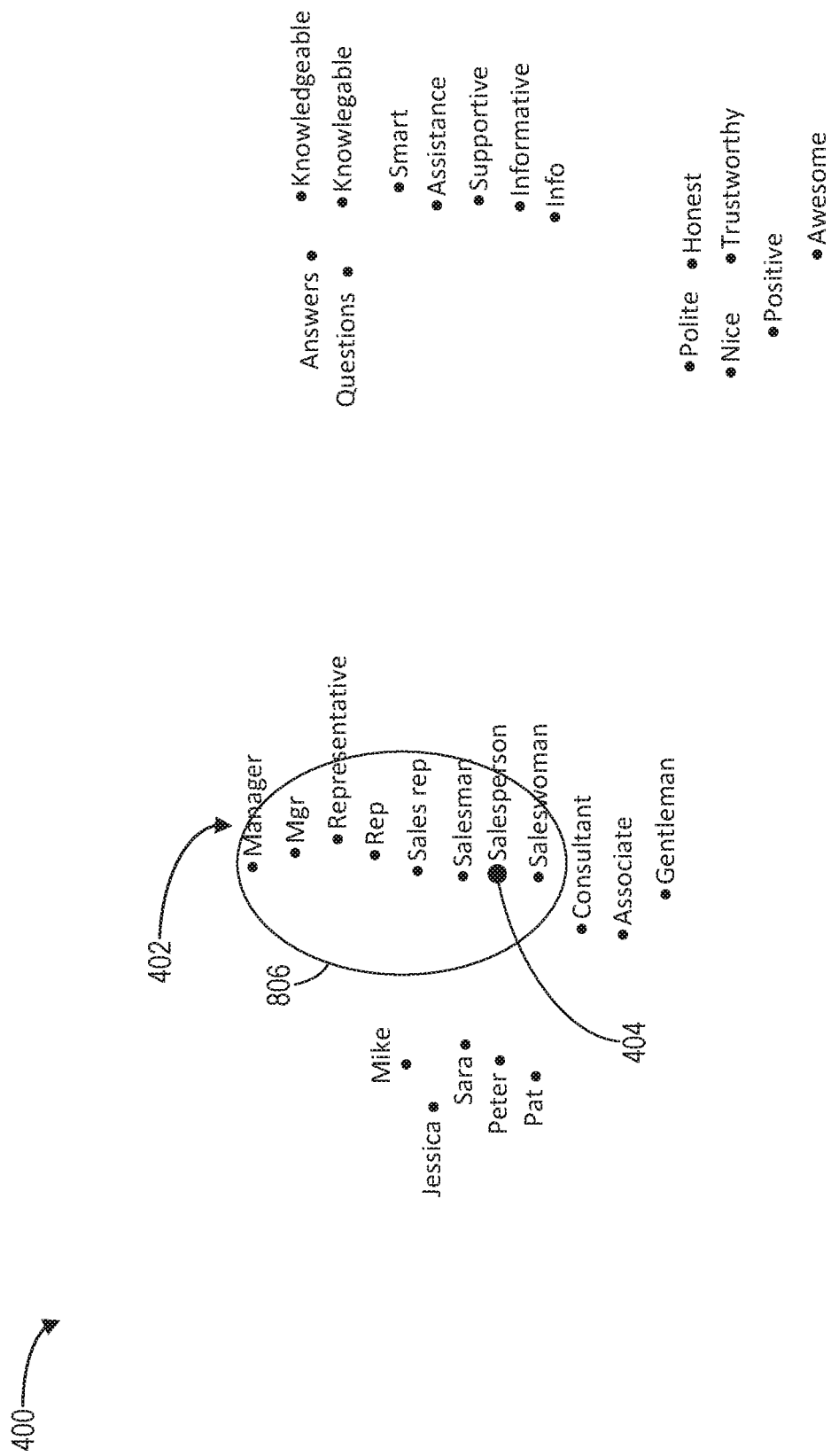
FIG. 8A illustrates an example vector mapping of an expanded modified topic cluster in accordance with one or more embodiments described herein.
Figure 8B:
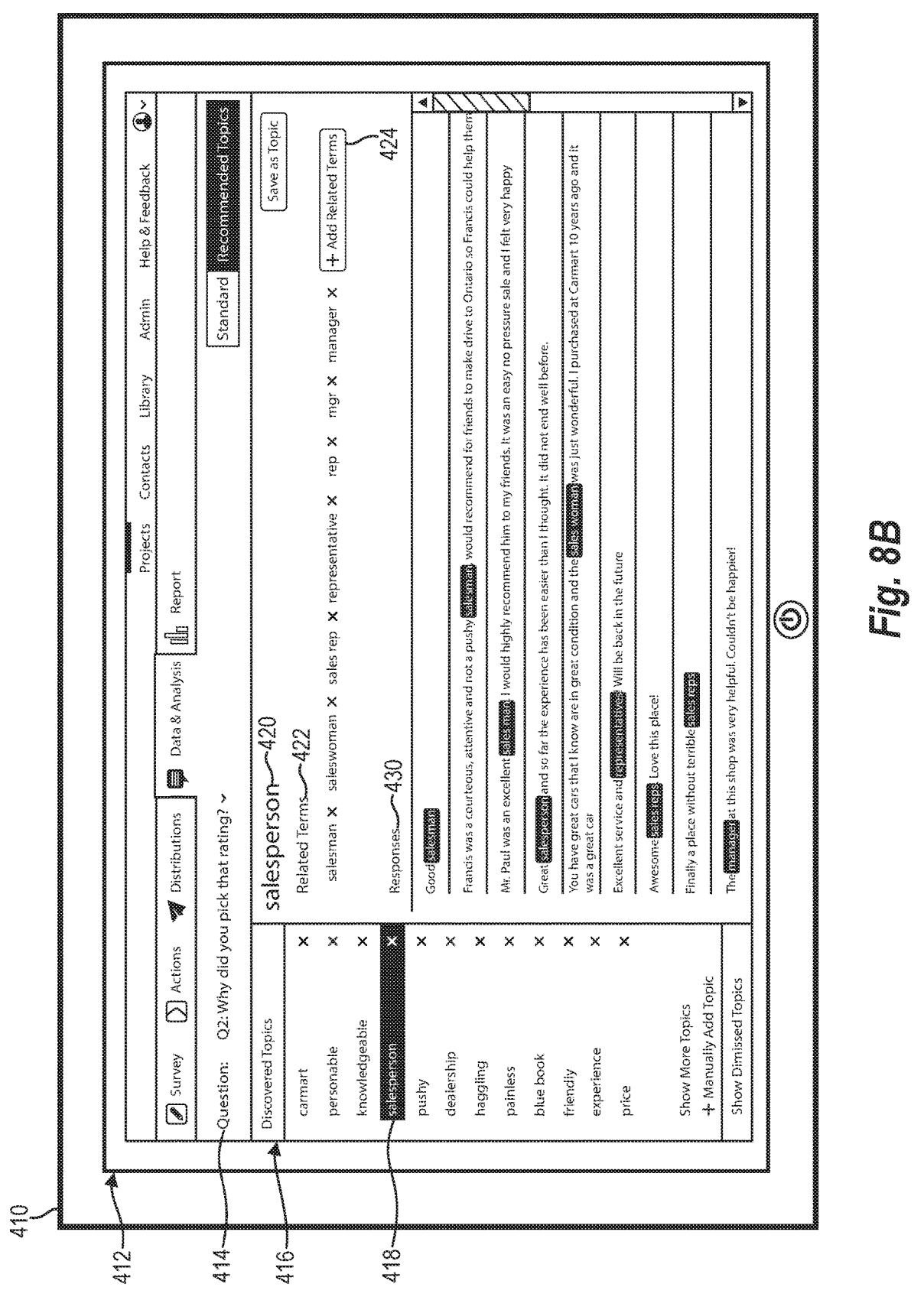

As described previously, when a user selects the add-terms element 424 (e.g., "Add Related Terms"), the content management system responds by identifying one or more additional terms to add to the selected topic cluster 418. In particular, the content management system expands the similarity threshold (in vector space) until one or more additional terms are added as related terms. Rather than universally expanding the similarity threshold (e.g., increasing the radius of the similarity threshold), in one or more embodiments, the content management system intelligently expands the similarity threshold based on the user learned intent. FIGS. 8A and 8B illustrate this concept.

FIG. 8A illustrates a vector mapping 400 of a modified expanded topic cluster. The vector mapping 400 is the same vector mapping introduced in FIG. 4A. For example, the vector mapping 400 shows terms 402 from a collection of text documents. The vector mapping 400 also includes the key term 404 selected by the content management system, as described above.

FIG. 8A also shows a modified expanded similarity constraint (e.g., expanded similarity threshold 806). The expanded similarity threshold 806 is the result of the content management system intelligently expanding the modified similarity threshold based on the user learned intent. For example, if after performing removing the terms "Consultant" and "Associate" from the selected topic cluster the content management system learns to exclude the terms 402 in the vector mapping 400 that reside below the term "Saleswoman" as not being relevant to the selected topic cluster. Thus, upon receiving a modification request to add additional related terms to the selected topic cluster, the content management system expands the modified similarity threshold away from the terms that are not relevant to the topic cluster. As such, the content management system expands the modified expanded similarity threshold 806 upwards to include the terms "Mgr" and "Manager."

FIG. 8B illustrates the client device 410 and the graphical user interface 412 introduced above. The graphical user interface 412 in FIG. 8B updates to display the expanded modified topic cluster corresponding to FIG. 8A. As shown, the related terms 422 include the terms within the expanded modified similarity threshold. Further, the content management system updates the topic clusters and reorganizes the text documents in the cluster-matched documents 430 based on the modified topic cluster. For example, the last text document shown in the cluster-matched documents 430 includes the term "manager," which is included in the related terms 422 of the expanded modified topic cluster.

In one or more embodiments, the content management system allows a user to perform additional topic modifications, such as splitting and merging topic clusters. For example, the content management system receives a modification request to split a related term from the selected topic cluster 418 into a new topic. For instance, the user drags a selected related term from the related terms 422 to the list 416 of topic clusters to initiate the topic split request. Alternatively, the content management system enables the user to request a topic cluster split using other user input methods. Then, based on the modification request, the content management system can create a new topic cluster, redefine the current topic clusters, and reorganize the text documents.

Figure 9A:
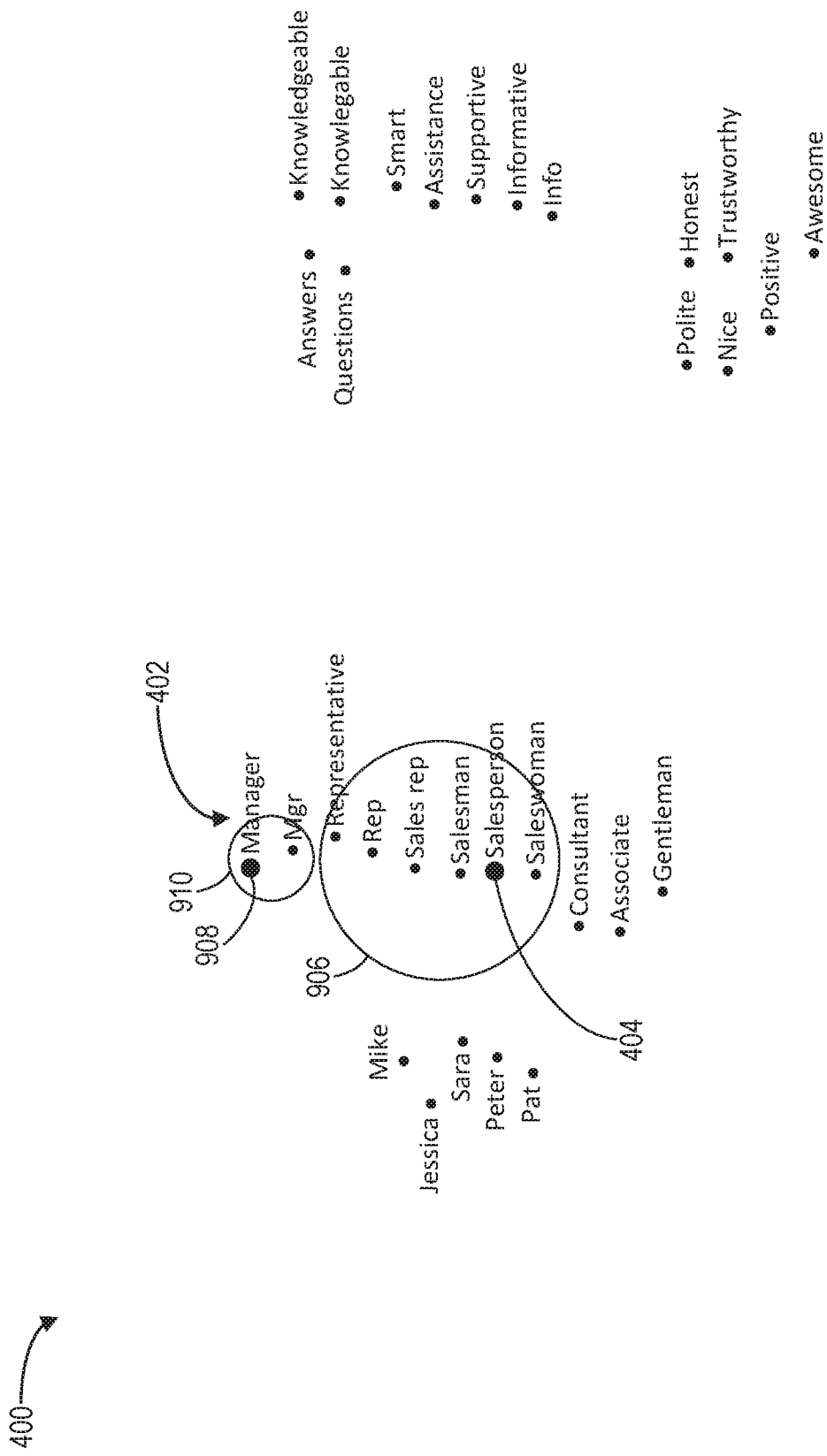
FIG. 9A illustrates an example vector mapping of split topic clusters in accordance with one or more embodiments described herein.
Figure 9B:
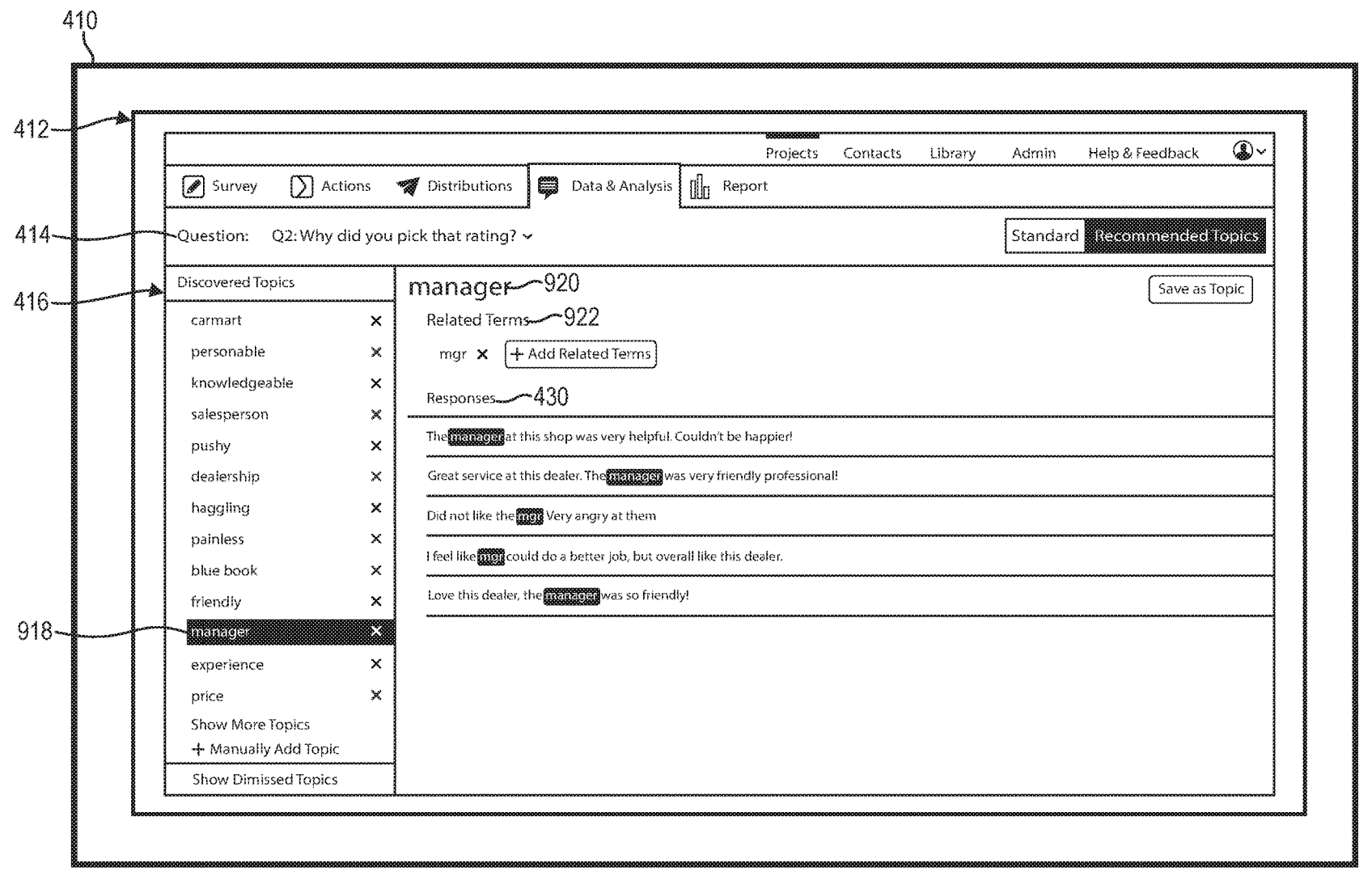

To illustrate by way of example, within the related terms 422 for the selected topic cluster 418, the user requests to split the related term "manager" into a new topic cluster. In other words, the content management system receives a modification request to create a new topic cluster using the term "manager" as the topic cluster's key term. FIGS. 9A and 9B below illustrate the content management system splitting topic clusters based on this example.

FIG. 9A illustrates a vector mapping 400 of split topic clusters. The vector mapping 400 is the same vector mapping introduced in FIG. 4A. For example, the vector mapping 400 shows terms 402 from a collection of text documents. The vector mapping 400 also includes the key term 404 selected by the content management system, as described above. As shown in FIG. 9A, the content management system splits the original topic cluster into two separate topic clusters in response to a user's modification request. For example, the vector mapping 400 shows the first topic cluster with "Salesperson" as the key term 404 having a corresponding similarity threshold 906. In addition, the vector mapping shows a newly-created second topic cluster with "Manager" as the new key term 908 and a new similarity threshold 910.

When the content management system creates the second topic cluster by splitting the first topic cluster, in one or more embodiments, the content management system determines whether to move related terms from the first topic cluster to the second topic cluster. For example, in response to receiving the modification request to create a new topic cluster using the term "manager," the content management system removes the term from the first topic cluster and assigns it as the new key term 908. In addition, the content management system creates the new similarity threshold 910 around the new key term 908. Further, the content management system reduces the similarity threshold 906 from the first topic cluster such that the two similarity thresholds do not overlap (e.g., the content management system enforces the mutually exclusive constraint for terms described above). Alternatively, the content management system allows the similarity thresholds to overlap and include repeated related terms in their respective topic clusters.

In creating the new similarity threshold 910 around the new key term 908, the content management system may employ default values that define the size and/or shape of the new similarity threshold 910. For example, the content management system sets the new similarity threshold 910 to include a default number of related terms. As another example, the content management system sets the new similarity threshold 910 to be a default radius about the new key term 908. As shown, the new similarity threshold 910 includes the related term "Manager," however, the new similarity threshold 910 may also include additional the related terms not shown.

FIG. 9B illustrates the client device 410 and the graphical user interface 412 introduced above. The graphical user interface 412 in FIG. 9B updates to display the split topic cluster corresponding to FIG. 9A. As shown, the graphical user interface 412 updates to display the newly-created topic cluster as the selected topic cluster 918. Likewise, the graphical user interface 412 updates to show the key term 920 and related terms 922 of the selected topic cluster 918.

In addition, the graphical user interface 412 updates, as described above, to display text documents in the cluster-matched documents 430 that correspond to the newly-created topic cluster. For example, the text documents in the cluster-matched documents 430 include either the term "manager" or "mgr." Further, the content management system emphasizes the occurrence of terms from the selected topic cluster 918 in each text document within the cluster-matched documents 430, as described above.

In one or more embodiments, when splitting topic clusters, the content management system prompts the user for one or more related terms to add to the newly-created topic cluster. For example, the content management system prompts the user regarding which related terms should remain in the original topic cluster and which related terms should be moved to the new topic cluster. In addition, the content management system prompts the user to input additional terms to include in the new topic cluster. Further, even after the content management system splits a topic cluster, the content management system enables a user to move related terms from one topic cluster to another topic cluster. For instance, the graphical user interface 412 facilitates a user to move a related term between topic clusters by dragging a related term from the selected topic cluster 918 to another topic cluster shown in the list 416 of topic clusters.

Just as the content management system enables a user to split topic clusters, the content management system also facilitates a user to merge or join two topic clusters together. For example, the content management system enables the user to combine topic clusters by dragging one topic cluster on another topic cluster within the list 416 of topic clusters. Alternatively, the content management system enables the user to otherwise request that the content management system merge or join two topic clusters. The concept of merging topic clusters is described in connection with FIGS. 10A, 10B, and 10C.

Figure 10A:
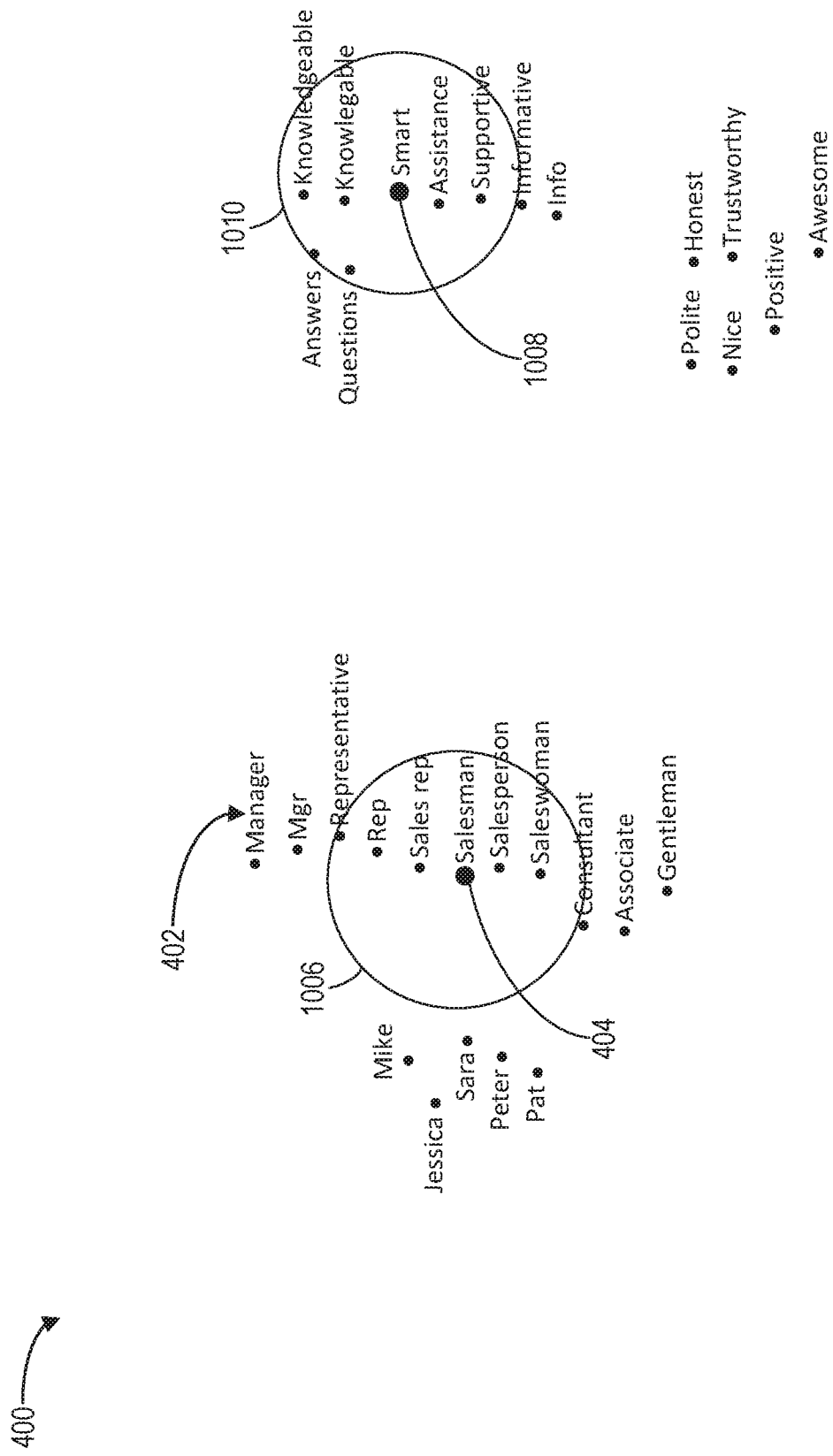
FIG. 10A illustrates an example vector mapping of a merged topic cluster in accordance with one or more embodiments described herein.

FIG. 10A illustrates a vector mapping 400 of merging two topic clusters. The vector mapping 400 is the same vector mapping introduced in FIG. 4A. For example, the vector mapping 400 shows terms 402 from a collection of text documents. The vector mapping 400 in FIG. 10 also includes two topic clusters. The first topic cluster includes the key term 404 of "Salesman" and corresponding similarity threshold 1006. The second topic cluster includes the key term 1008 of "Smart" and a corresponding similarity threshold 1010.

Figure 10B:
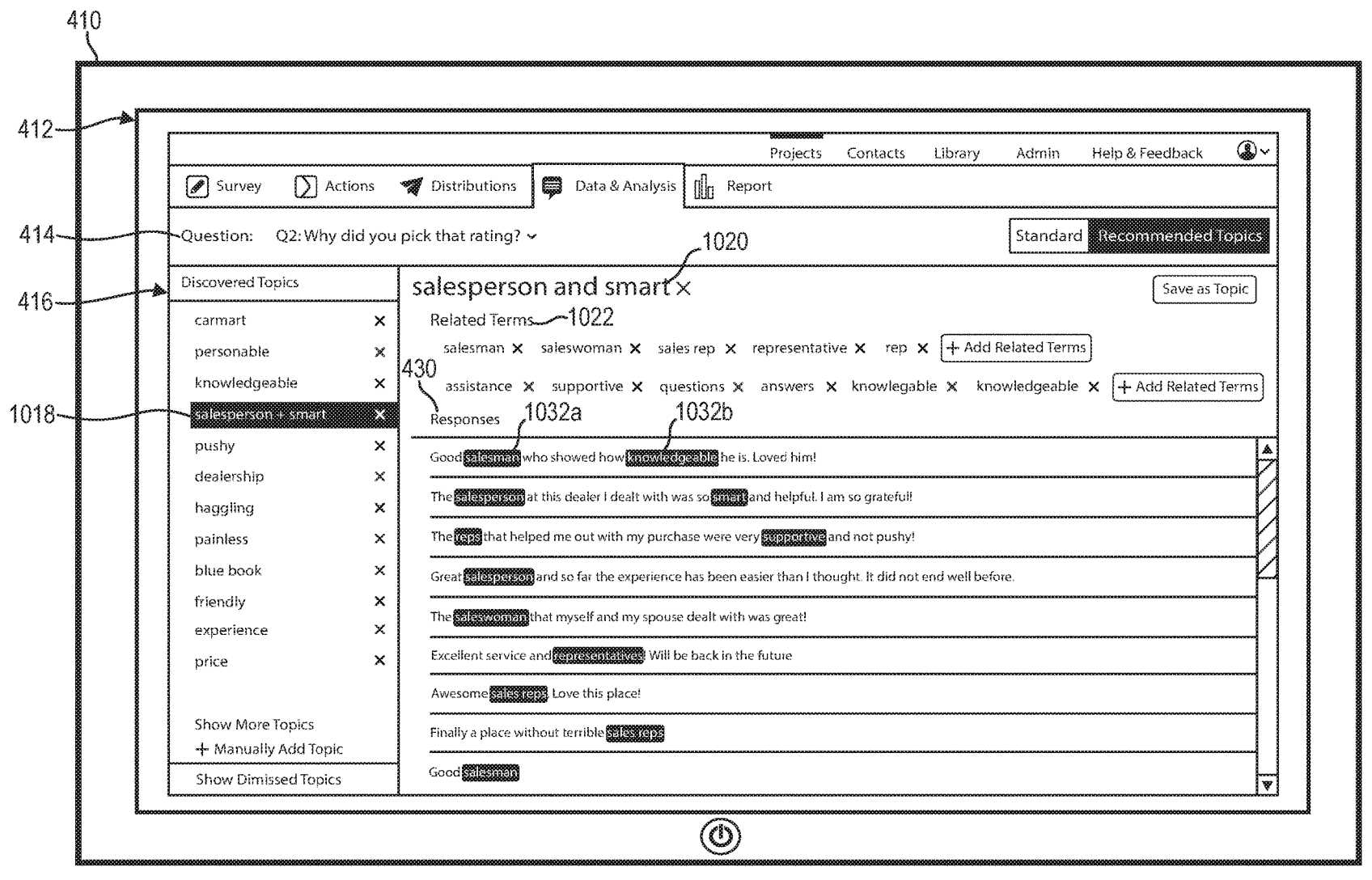

While the vector mapping 400 shows two topic clusters, the content management system can combine the topic clusters together as a merged or joint topic cluster when presenting topic clusters to a user. To illustrate, FIG. 10B illustrates the client device 410 and the graphical user interface 412 introduced above. The graphical user interface 412 in FIG. 10B updates to display the merged topic cluster corresponding to FIG. 10A. As shown, the graphical user interface 412 updates to display the merged topic cluster as the selected topic cluster 1018.

In addition, the graphical user interface 412 updates to show the merged key terms 1020 and merged related terms 1022 for the selected topic cluster 1018. In particular, the merged key terms 1020 include one or more key terms that the content management system has joined to from the merged topic cluster. Further, the merged related terms 1022 show a list of related terms for each of the key terms in the merged topic cluster. As described above, the content management system enables a user to add, remove, and/or modify related terms from a selected topic cluster.

In addition, the graphical user interface 412 updates, as described above, to display text documents in the cluster-matched documents 430 that correspond to the merged topic cluster. For example, the text documents in the cluster-matched documents 430 include terms from the merged related terms 1022. Further, the content management system emphasizes the occurrence of terms from the selected topic cluster 1018 in each text document, as described above. For instance, the first text document in the cluster-matched documents 430 shows a first emphasized term 1032a (e.g., salesperson) and a second emphasized term 1032b (e.g., knowledgeable).

In one or more embodiments, when the content management system is merging topic clusters, the content management system performs an OR, AND, and/or NOT operation on the topic clusters (e.g., depending on user preference). More specifically, when the content management system combines topic clusters with the OR operation, the content management system identifies and provides text documents in the cluster-matched documents 430 that contain terms for either topic clusters. As shown in FIG. 10B, the content management system employs the OR operation when determining which text documents to include in the cluster-matched documents 430.

When the content management system combines topic clusters with the AND operation, the content management system identifies and provides text documents in the cluster-matched documents 430 that contain terms from both of the merged topic clusters. Similarly, when the content management system combines topic clusters with the NOT operation, the content management system identifies and provides text documents in the cluster-matched documents 430 that contain terms from a first topic cluster so long as terms from the second topic cluster are not present in the same text documents. For example, if the user requested the content management system provide text documents from the topic cluster "salesperson" and NOT "smart," the selected topic cluster could show "salesperson—smart" and the merged key term 1020 could show "salesperson and not smart" or "salesperson excluding smart." Further, the related terms 1022 could specify which related terms the content management system is positively matching (e.g., OR and AND) and negatively matching (e.g., NOT) from the text documents within the cluster-matched documents 430.

In some embodiments, the content management system can recommend topic clusters to AND together to a user. For example, the content management system analyzes pairs of topic clusters to determine if various combinations of topic clusters co-occur with a threshold amount of regularity. In particular, the content management system identifies terms from two topic clusters appear close to each other (i.e., a co-occurrence) in text documents, but that are distant from each other in vector space so as to not belong to the same topic cluster. Stated differently, if a co-occurrence term (e.g., a key term from a second topic cluster) is close to the key term of a first topic cluster in vector space, the content management system may identify the co-occurrence term as a related word. However, if the co-occurrence term is located beyond a threshold distance away from the key term of the first topic cluster, the content management system may recommend the user combine the terms using the AND operation. Such combinations may provide additional insights and patterns that the user would otherwise miss. For instance, the larger the distance between the terms in the vector space, the less noticeable the combination of the terms are to a user.

As an example of co-occurrence terms, in a course evaluation survey, the terms "professor" and "teaching style" both frequently occur in the same responses while not being located near each other in the vector space. Other examples include the terms "professor" and "homework," "professor" and "grading," and "professor" and "favorite." The content management system can rank recommendations based on the significance values of the terms. For instance, if the significance values indicate the ranking: homework>teaching style>grading>favorite, the content management system can recommend combining "professor" and "homework" before "professor" and "teaching style." Further, the content management system can dismiss co-occurrence terms below a minimum significance value limit (e.g., dismiss "favorite" as being too common of a word as indicated by its significance value being below the minimum significance value limit).

In addition, the content management system can factor in vector space distance when determining which combinations to recommend. For example, the content management system requires a co-occurrence term to be a minimum distance from the key term of the first topic cluster. This threshold can correspond to the similarity threshold or another user-adjustable threshold. In addition, the content management system can indicate topic cluster combinations, such as provide a limited number of recommended topic cluster combinations (e.g., 3-5) to the user upon a user selecting a topic cluster.

Figure 10C:
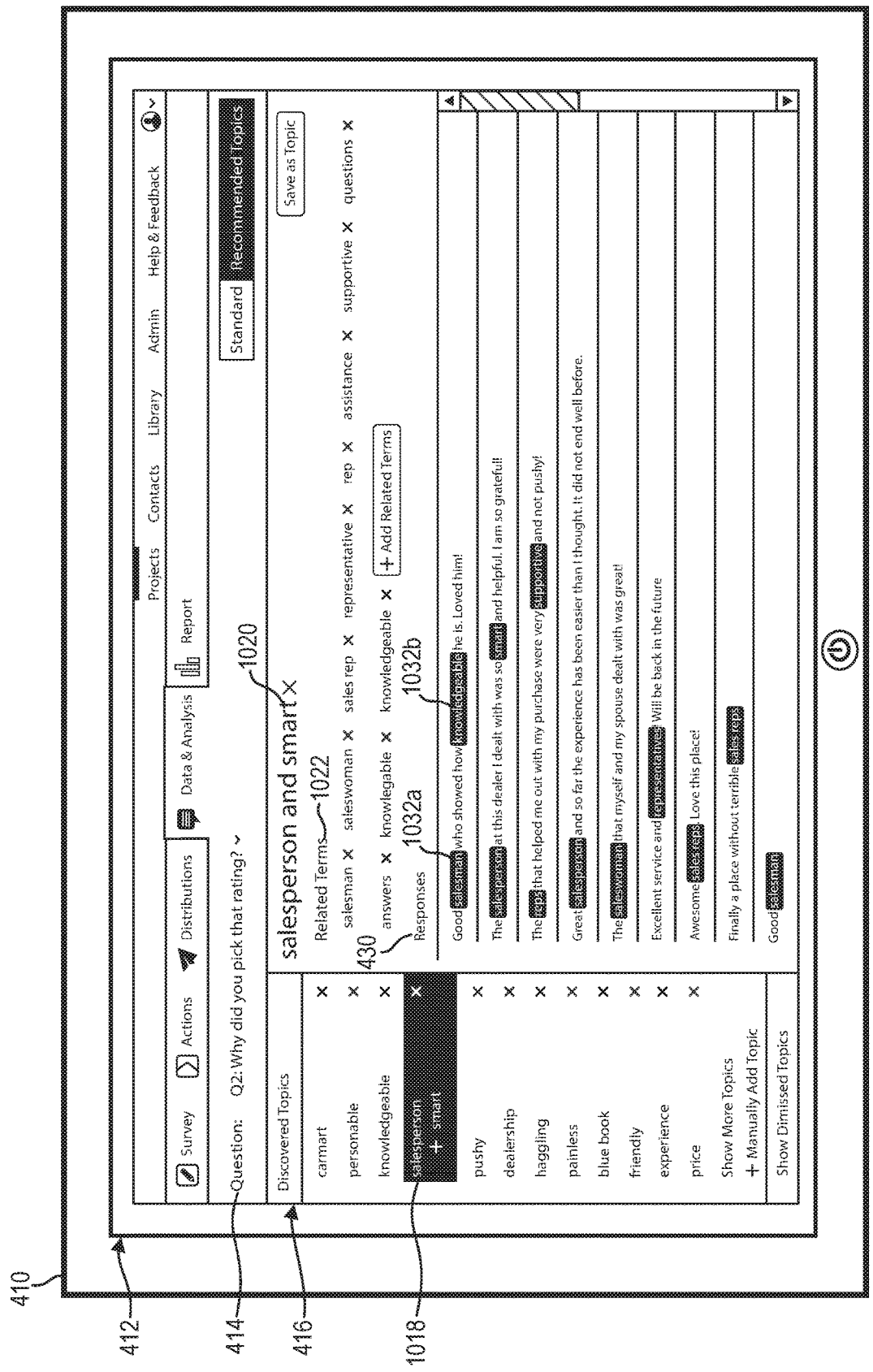

FIG. 10C illustrates an alternative graphical user interface view of FIG. 10B. As shown, FIG. 10C includes the same or similar elements as FIG. 10B, but are arranged in an alternative configuration. One will appreciate based on the disclosure herein, and as noted above, that the content management system can arrange the graphical user interface 412 in a variety of configurations and arrangements.

Figure 11:
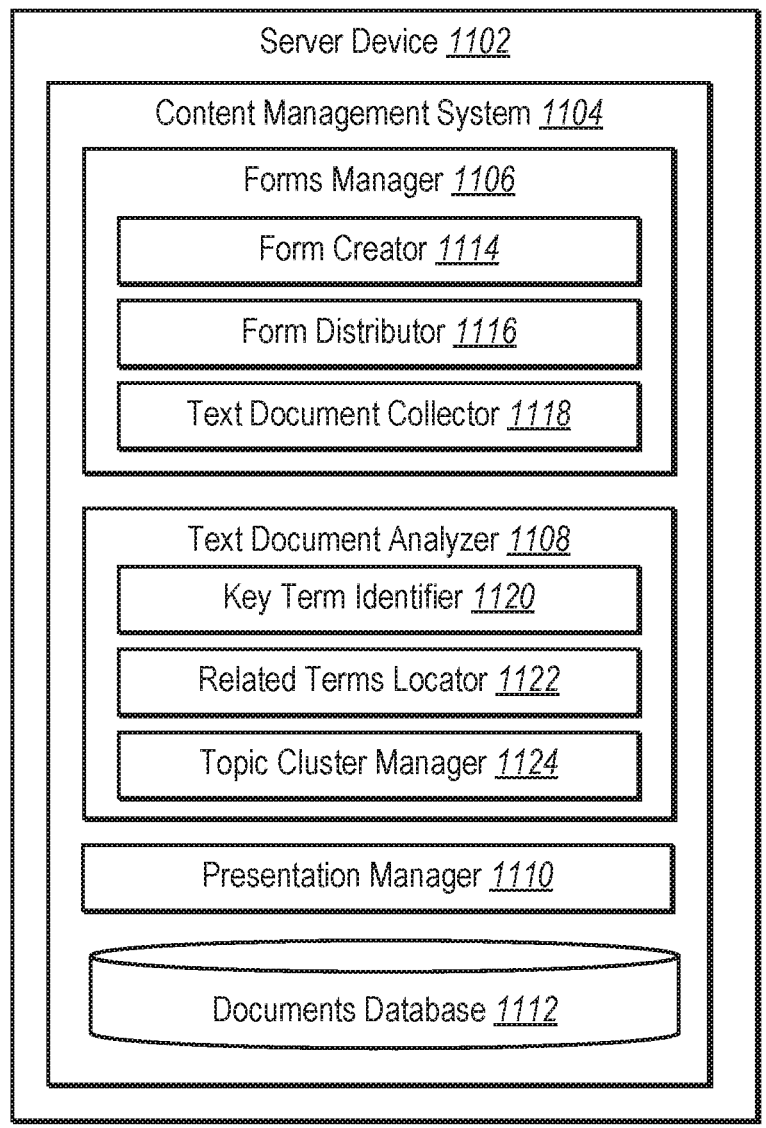
FIG. 11 illustrates a schematic diagram of a content management system in accordance with one or more embodiments described herein.

FIG. 11 illustrates a schematic diagram of a content management system 1104. As shown, the content management system 1104 operates on a server device 1102. The server device 1102 and the content management system 1104 are example embodiments of the server device 102 and the content management system 104 described above with respect to FIG. 1. Further, the content management system 1104 can represent one of the content management systems described herein.

The content management system 1104 in FIG. 11 includes various components (e.g., 1106-1124) for performing the methods, processes, and features described herein. As illustrated, the content management system 1104 includes a forms manager 1106, a text document analyzer 1108, a presentation manager 1110, and a documents database 1112. The various components of the content management system 1104 communicate with each other using any suitable communication protocols, such as described with respect to FIGS. 13 and 14 below.

Each component (e.g., 1106-1124) of the content management system 1104 may be implemented using one or more computing devices, (e.g., server device 1102 or multiple server devices) including at least one processor executing instructions that cause the content management system 1104 to perform the processes described herein. Although a particular number of components are shown in FIG. 11, the content management system 1104 can include more components or can combine the components into fewer components (such as a single component), as may be desirable for a particular implementation.

As illustrated, the content management system 1104 includes a forms manager 1106. The forms manager 1106 can manage the creation of an electronic document form that prompts feedback from respondents in the form of electronic text documents (e.g., text documents). Additionally, the forms manager 1106 can facilitate the identification of potential respondents and the distribution of electronic document form (e.g., surveys). Further, the forms manager 1106 can manage the collection of text documents provided by respondents. Accordingly, the forms manager 1106 includes a forms creator 1114, a forms distributor 1116, and a text document collector 1118, as shown in FIG. 11.

The forms creator 1114 assists a user (e.g., an administrator, presentation manager, and/or survey creator) in creating one or more electronic document forms. For example, the forms creator 1114 provides tools to the user for selecting various template form types. In general, an electronic document form prompts a user to provide open-ended or unstructured text in response to the electronic document form.

The content management system 1104 also includes a forms distributor 1116. When the content management system 1104 administers one or more electronic document forms (e.g., a survey), the forms distributor 1116 may send the electronic document forms to designated respondents. In particular, the forms distributor 1116 may send the electronic document forms to respondents via one or more distribution channels selected by the user, such as via a website, text message, instant message, electronic message, mobile application, etc.

The text document collector 1118 collects and sorts text documents from respondents. The text document collector 1118 may collect text documents in a variety of ways. To illustrate, the text document collector 1118 may extract responses to a single electronic document form (e.g., a survey question) in bulk. For example, the text document collector 1118 collects multiple text documents to an electronic document form in a single resource grab. In addition, or in the alternative, the text document collector 1118 collects responses to an electronic document form in real-time or periodically as respondents provide text documents responding to the electronic document form.

In one or more embodiments, upon collecting text documents, the text document collector 1118 facilitates the storage of the text documents. For example, the text document collector 1118 stores responses in the documents database 1112. In some embodiments, the text document collector 1118 stores text documents for each electronic document form separately. Additionally, or alternatively, the text document collector 1118 stores the text documents outside of the content management system 1104, such as on an electronic storage system belonging to a third-party.

As shown in FIG. 11, and as mentioned above, the content management system 1104 includes a text document analyzer 1108. In general, the text document analyzer 1108 identifies key terms, locates related terms, and creates topic clusters. As such, the text document analyzer 1108 includes a key term identifier 1120, a related terms locator 1122, and a topic cluster manager 1124.

The key term identifier 1120 identifies one or more key terms from terms within a collection of text documents. In some embodiments, the key term identifier 1120 calculates significance values for each term in the collection of text documents, as detailed above. The key term identifier 1120 then can then select a number of terms (e.g., N terms with the highest significance values) as key terms. The key term identifier 1120 can also perform the other functions in connection with identifying key terms, as provided above.

The related terms locator 1122 locates terms that are related to a selected key term. The related terms locator 1122 can use a word vector model to assign word vector values to each term found in the text documents. Using the word vector values for each term, the related terms locator 1122 can identify terms that are similar to the key term. For example, given a key term, the related terms locator 1122 identifies related terms that satisfy a similarity threshold (e.g., A). Additional description regarding the related terms locator 1122 is provided above.

The topic cluster manager 1124 manages topic clusters, which includes a key term grouped to corresponding related terms. As previously explained, the topic cluster manager 1124 generates topic clusters. Further, as described above, based on user input and/or machine learning, the topic cluster manager 1124 can create, modify, and update topic clusters. Additional description regarding the topic cluster manager 1124 is provided above.

The presentation manager 1110 provides a display of topic clusters to a user. For example, the presentation manager 1110 provides a graphical user interface that a client device displays to a user. The graphical user interface can include the various components, as shown in the above figures. In addition, the presentation manager 1110 enables a user to interact with one or more elements or components within the graphical user interface. For example, while interacting with the graphical user interface, a user can request the content management system modify topic clusters and/or related terms, as described above.

As shown in FIG. 11, the content management system 1104 may include a documents database 1112. The documents database 1112 can include a single database or multiple databases. In one or more embodiments, the documents database 1112 is located within the content management system 1104. Alternatively, the documents database 1112 may be external to the content management system 1104, such as in cloud storage. Further, the documents database 1112 may store and provide data and information to the content management system 1104, as described below.

In one or more example embodiments, the documents database 1112 includes electronic document forms, such as those created via the forms manager 1106. Further, the documents database 1112 may also include electronic document forms imported from third-party sources. In addition, the documents database 1112 may store information about each electronic document form, such as parameters and preferences that correspond to each electronic document form. For example, when a user creates an electronic document form, he or she specifies that the electronic document form is administered via a particular distribution channel. As such, the documents database 1112 notes the user's specified selection.

In some embodiments, the document database 1112 maintains tags (or labels) for one or more text documents or collections of text documents. In particular, for each text document associated with a key term, associated term, and/or topic cluster, the document database 1112 stores the tag as metadata for each text document. In addition, document database 1112 enables the content management system 1104 or another outside system to query the document database 1112 for text documents based on one or more tags. In this manner, document database 1112 enables the content management system 1104 or another outside system to generate statistical or other reports based on tags associated with text documents.

Figure 12:
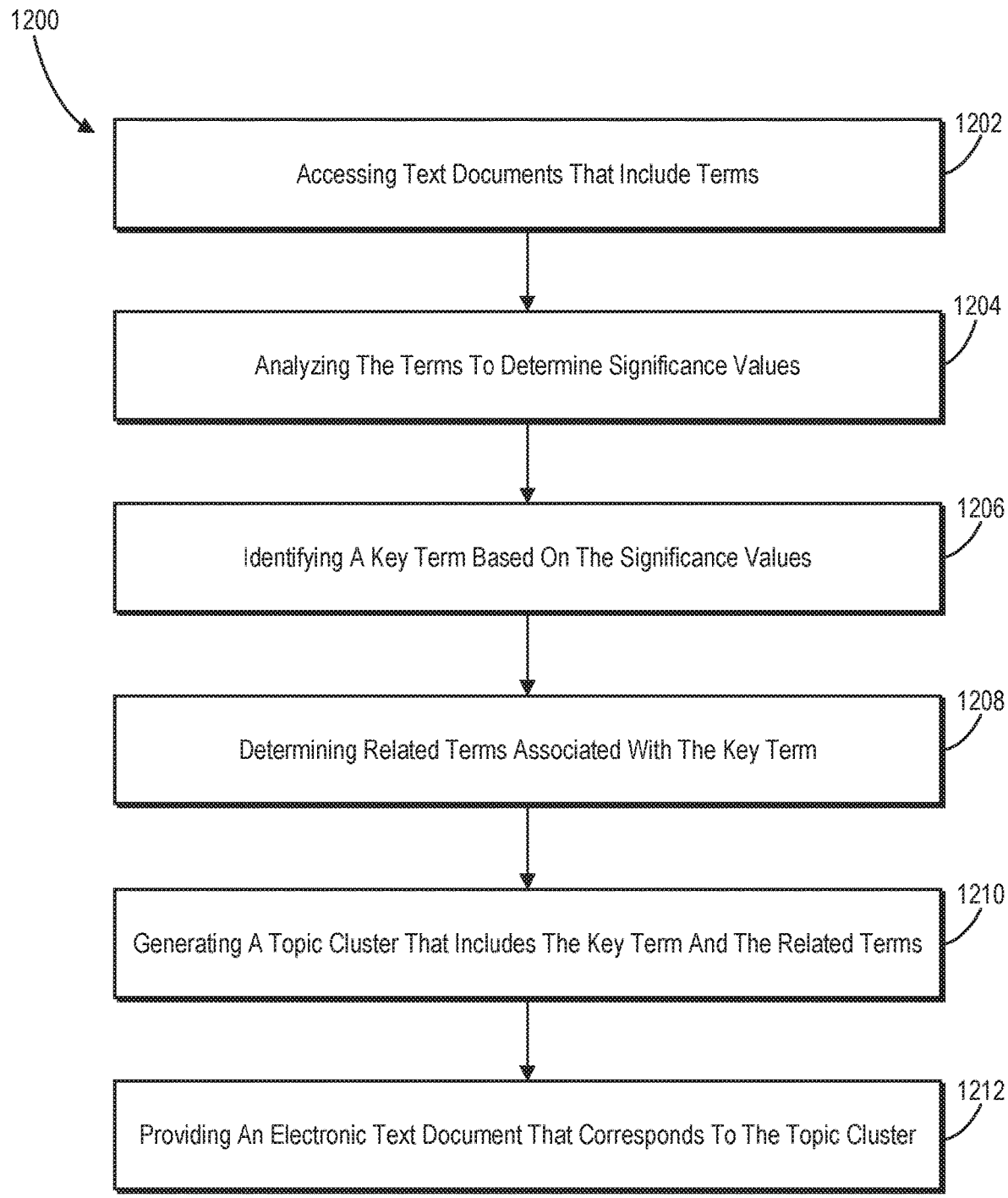
FIG. 12 illustrates an example flow diagram of a method for forming topic clusters in accordance with one or more embodiments described herein.

FIG. 12 illustrates an example flow diagram of a method 1200 for forming topic clusters in accordance with one or more embodiments described herein. The method 1200 can be implemented by one or more embodiments of the content management system described above. For example, the server device 102 hosting the content management system 104 performs the method 1200.

The method 1200 includes an act 1202 of accessing text documents that include terms. In particular, the act 1202 can involve accessing a plurality of electronic text documents comprising a plurality of terms. The act 1202 can include obtaining the plurality of electronic text documents from a database of electronic text documents, from client devices associated with recipient users, and/or from a third-party source.

The method 1200 also includes an act 1204 of analyzing the terms to determine significance values. In particular, the act 1204 can involve analyzing the plurality of terms to determine a significance value for each term. In some embodiments, the significance value is a statistically improbable phrase (SIP) value. For example, the act 1204 includes identifying a text corpus comprising corpus terms and generating the statistically improbable phrase value for each term within the plurality of electronic text documents by comparing a sample frequency occurrence of a given term in the plurality of electronic text documents with a corpus frequency occurrence of the given term in the text corpus. Further, in some embodiments, the act 1204 involves determining the frequency occurrence of each term in the plurality of electronic text documents as a ratio of a number of times the term occurs in the plurality of electronic text documents over a total number of words in the plurality of electronic text documents, and determining the corpus frequency occurrence of each term in the text corpus of terms as a ratio of a number of times the term occurs in the text corpus over a total number of words in the text corpus.

In addition, the method 1200 includes an act 1206 of identifying a key term based on the significance values. In particular, the act 1206 can involve identifying, based on the significance value determined for each term, a key term from the plurality of terms. In some embodiments, the act 1206 includes ranking the plurality of terms based on the significance value for each term, and where identifying the key term from the plurality of terms comprises determining the key term is a highest ranked term from the plurality of terms.

The method 1200 also includes an act 1208 of determining related terms associated with the key term. In particular, the act 1208 can involve determining, from the plurality of terms, one or more related terms associated with the key term. In one or more embodiments, the act 1208 includes identifying one or more terms from the plurality of terms of the plurality of electronic text documents that are located proximate the key term in an n-dimensional vector space, where the one or more related terms associated with the key term includes the one or more terms that are located proximate the key term in an n-dimensional vector space. In some cases, the one or more related terms associated with the key term are located proximate the key term when the one or more key terms are located within a threshold distance from the key term in the n-dimensional vector space.

Further, the method 1200 includes an act 1210 of generating a topic cluster that includes the key term and related terms. In particular, the act 1210 can involve generating a topic cluster comprising the key term and the one or more related terms associated with the key term. In some embodiments, the act 1210 also includes organizing a topic cluster based on the significance value of the key term within the topic cluster.

In addition, the method 1200 also includes an act 1212 of providing an electronic text document that corresponds to the topic cluster. In some embodiments, the act 1212 of providing, to a client device associated with a user, at least one electronic text document from the plurality of electronic text documents that corresponds to the topic cluster. In one or more embodiments, the method 1200 includes acts of providing the electronic text document to the user that includes a term from the topic cluster and, in some cases, emphasizing the term from the topic cluster included within the one or more electronic text documents.

In some embodiments, the method 1200 includes acts of receiving an indication of a user selection a topic corresponding to of the topic cluster; and providing, for presentation to the user and in response to the indication of the user selection of the topic cluster, one or more electronic text documents from the plurality of electronic text documents that include at least one term from the topic cluster. In further embodiments, the method 1200 also includes acts of receiving an indication of a user selection to expand the topic cluster; increasing, in response to the indication of a user selection to expand the topic cluster, the threshold distance from the key term in the n-dimensional vector space to include one or more additional terms associated with the key term; modifying the topic cluster to include the key term, the one or more related terms associated with the key term, and the one or more additional terms associated with the key term; and providing, for presentation to the user and in response to the indication of the user selection to expand the topic cluster, an additional electronic text document from the plurality of electronic text documents that includes at least one term from the one or more additional terms associated with the key term.

In some embodiments, the method 1200 includes acts of receiving an indication of a user selection to expand the topic cluster; increasing, in response to the selection to expand, the threshold distance from the key term in the n-dimensional vector space to include one or more additional terms associated with the key term; modifying the topic cluster to include the key term, the one or more related terms associated with the key term, and the one or more additional terms associated with the key term; and providing, for presentation to the user and in response to the indication of the user selection to expand the topic cluster, an additional electronic text document from the plurality of electronic text documents that includes at least one term from the one or more additional terms associated with the key term.

In one or more embodiments, the method 1200 also includes acts of receiving an indication of a user selection of a term to exclude from the one or more related terms associated with the key term; modifying the topic cluster by removing the term to exclude from the topic cluster; and providing, for presentation to the user and in response to the indication of the user selection of the term to exclude, one or more electronic text documents from the plurality of electronic text documents that have at least one term from the modified topic cluster.

In some embodiments, the method 1200 includes acts of receiving an indication of a user selection to merge the topic cluster with an additional topic cluster; merging, the additional topic cluster with the topic cluster based on the key term associated with the topic cluster having a higher significance value than the key term associated with the additional topic cluster; and present the merged topic cluster to the user.

Figure 13:
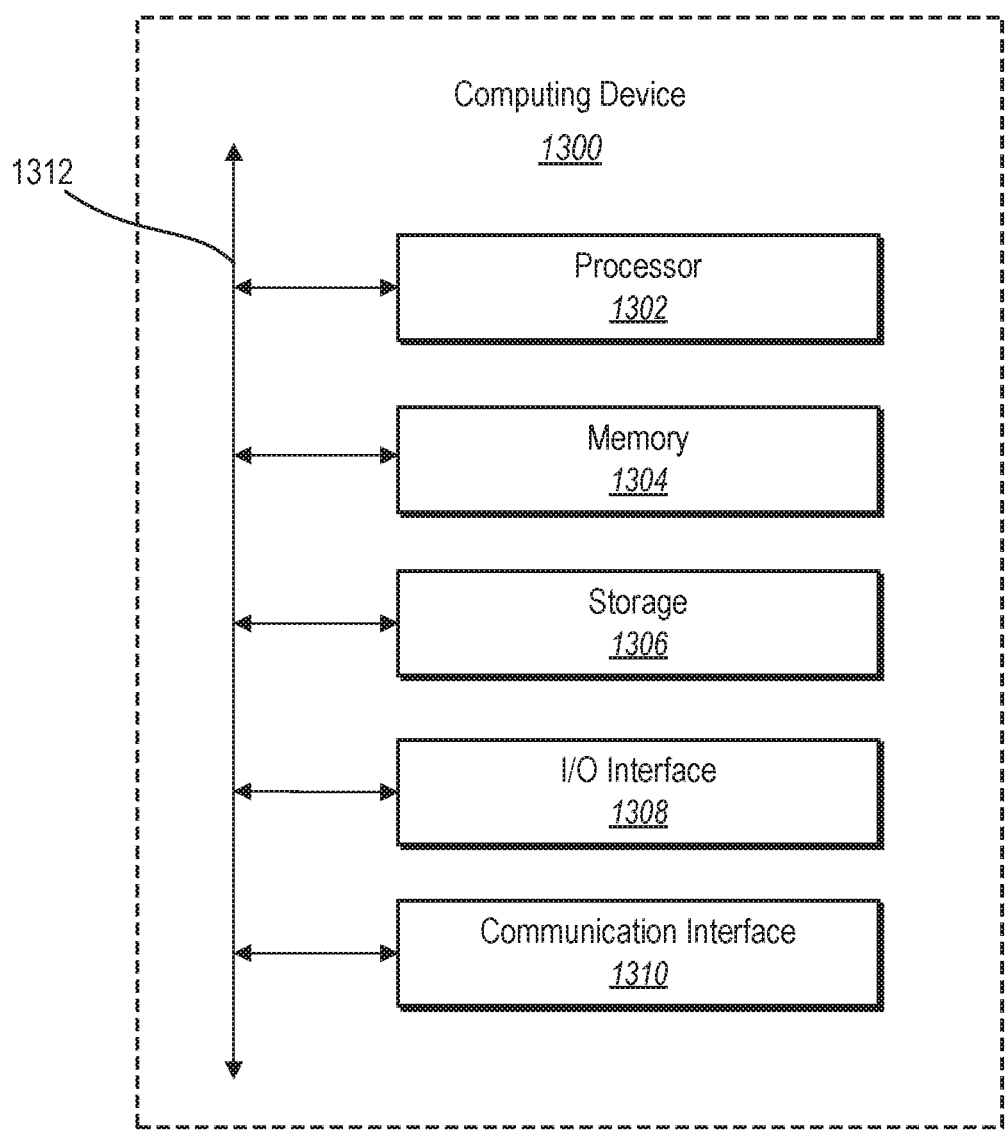
FIG. 13 illustrates a block diagram of an exemplary computing device in accordance with one or more embodiments described herein.

Further, in a number of embodiments, the method 1200 includes acts of receiving an indication of a user selection to add a topic cluster to the presentation of topic clusters within the graphical user interface; identifying an additional key term based on the determined significance values and corresponding related terms associated with the additional key term; and providing, for presentation to the user and in response to the indication of the user selection to add a topic cluster, one or more electronic text documents from the plurality of electronic text documents that include at least one term from the additional topic cluster FIG. 13 illustrates a block diagram of exemplary computing device 1300 that may be configured to perform one or more of the processes described above. One will appreciate that the computing device 1300 may represent one or more client devices or server devices, such as those described previously. For example, the computing device 1300 embodies the administrator client device 106 or respondent client devices 108 described above. Additionally, the computing device 1300 represents the server device 102, 1102 described above. Further, the computing device 1300 can implement one or more of the graphical user interfaces 412 previously described.

In some embodiments, users of the computing device 1300 may include an individual (i.e., a human user), a business, a group, or other entity. Further, the computing device 1300 may represent various types of computing devices. One type of computing device includes a mobile device (e.g., a cell phone, a smartphone, a PDA, a tablet, a laptop, a watch, a wearable device, etc.). Another type of computing device includes a non-mobile device (e.g., a desktop or server; or another type of client device).

As shown in FIG. 13, the computing device 1300 can include a processor 1302, a memory 1304, a storage 1306 device, an I/O interface 1308, and a communication interface 1310, which may be communicatively coupled by way of a communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13.

In one or more embodiments, the processor 1302 includes hardware for executing instructions, such as those making up a computer program. The memory 1304 may be used for storing data, metadata, and programs for execution by the processor 1302($s$). The storage 1306 device includes storage 1306 for storing data or instructions.

The I/O interface 1308 allows a user to provide input to, receive output from, and otherwise transfer data to and receive data from the computing device 1300. The I/O interface 1308 may include a mouse, a keypad or a keyboard, a touchscreen, a camera, an optical scanner, network interface, modem, other known I/O devices or a combination of I/O interfaces. The I/O interface 1308 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, the communication interface 1310 may include a network interface controller (NIC) or network adapter for communicating with an Ethernet or other wire-based network or a wireless NIC (WNIC) or wireless adapter for communicating with a wireless network, such as a WI-FI. The communication infrastructure may include hardware, software, or both that couples components of the computing device 1300 to each other. As an example, the communication infrastructure may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., memory 1304, etc.), and executes those instructions, thereby performing one or more processes, including one or more of the processes described herein.

Non-transitory computer-readable storage 1306 media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions include, for example, instructions and data which, when executed by a processor, cause a general-purpose computer, a special-purpose computer, or a special-purpose processing device to perform a certain function or group of functions. In some embodiments, a general-purpose computer executes computer-executable instructions, which turns the general-purpose computer into a special-purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

Figure 14:
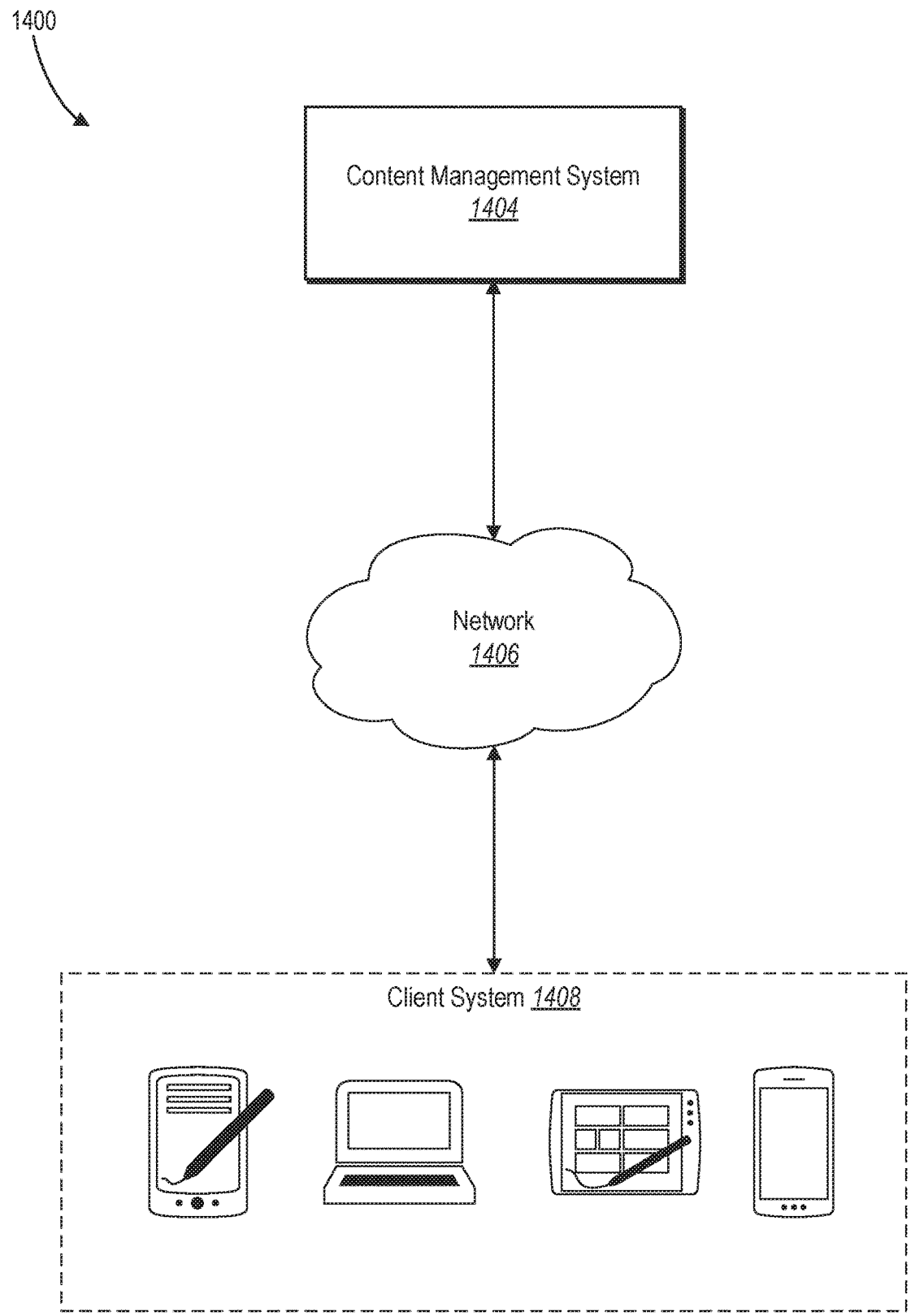
FIG. 14 illustrates an example network environment of a content management system in accordance with one or more embodiments described herein.

FIG. 14 illustrates an example network environment 1400 of a content management system 1404, such as embodiments of the content management system described herein. The network environment 1400 includes the content management system 1404 and a client system 1408 connected to each other by a network 1406. Although FIG. 14 illustrates a particular arrangement of the content management system 1404, the client system 1408, and the network 1406, one will appreciate that other arrangements of the network environment 1400 are possible. For example, a client device of the client system 1408 is directly connected to the content management system 1404. Moreover, this disclosure contemplates any suitable number of client systems, content management systems, and networks are possible. For instance, the network environment 1400 includes multiple client systems.

This disclosure contemplates any suitable network. As an example, one or more portions of the network 1406 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client system 1408 is an electronic device including hardware, software, or embedded logic components or a combination of two or more such components and capable of carrying out the appropriate functionalities implemented or supported by the client system. As an example, the client system 1408 includes any of the computing devices discussed above. The client system 1408 may enable a user at the client system 1408 to access the network 1406. Further, the client system 1408 may enable a user to communicate with other users at other client systems.

In some embodiments, the client system 1408 may include a web browser, such as and may have one or more add-ons, plug-ins, or other extensions. The client system 1408 may render a web page based on the HTML files from the server for presentation to the user. For example, the client system 1408 renders the graphical user interface described above.

In one or more embodiments, the content management system 1404 includes a variety of servers, sub-systems, programs, modules, logs, and data stores. In some embodiments, content management system 1404 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The content management system 1404 may also include suitable components such as network interfaces, security mechanisms, load balancers, failover servers, management-and-network-operations consoles, other suitable components, or any suitable combination thereof.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A method comprising:
 accessing a first plurality of multiple electronic text documents comprising a plurality of terms;

analyzing, by at least one processor, the plurality of terms to determine a statistically improbable phrase (SIP) value for each term by comparing a frequency occurrence of the term in the first plurality of multiple electronic text documents with a corpus frequency occurrence of the term in a text corpus, wherein the first plurality of multiple electronic text documents is from a separate data source than the text corpus;

identifying, based on the SIP value determined for each term, a key term from the plurality of terms;

determining, from the plurality of terms, one or more related terms associated with the key term based on the one or more related terms meeting a similarity threshold relative to the key term;

generating a topic cluster comprising the key term and the one or more related terms associated with the key term;

providing, for presentation on a client device associated with a user, a graphical user interface comprising a selectable option to identify the key term with the topic cluster as a topic of interest;

designating the key term and the topic cluster as the topic of interest based on receiving an indication of a user selection of the selectable option;

splitting the topic cluster into a first new topic cluster and a second new topic cluster by:
  receiving an indication of a user selection of a term to exclude from the topic cluster;
  determining at least one term, from the one or more related terms, to associate with the term to exclude based on the at least one term meeting a similarity threshold relative to the term to exclude;
  generating the first new topic cluster by removing the term to exclude and the at least one term associated with the term to exclude from the topic cluster; and
  generating the second new topic cluster by combining the term to exclude and the at least one term associated with the term to exclude;

providing, to the client device, a first electronic text document from the first plurality of multiple electronic text documents that corresponds to the first new topic cluster and a second electronic text document from the first plurality of multiple electronic text documents that corresponds to the second new topic cluster;

receiving, via the client device, an indication of an additional user selection to merge the first new topic cluster with the second new topic cluster;

in response to receiving the additional user selection, merging the second new topic cluster with the first new topic cluster to create a merged topic cluster; and based on merging the second new topic cluster with the first new topic cluster, modifying the graphical user interface to include a selectable option corresponding to the merged topic cluster.

2. The method of claim 1, further comprising:
ranking the plurality of terms based on the SIP value for each term; and
identifying the key term from the plurality of terms by determining that the key term is a highest ranked term from the plurality of terms.

3. The method of claim 1, wherein:
the frequency occurrence of the term in the first plurality of multiple electronic text documents comprises a number of times the term appears in the first plurality of multiple electronic text documents; and
the corpus frequency occurrence of the term in the text corpus comprises a number of times the term appears in the text corpus over a total number of words in the text corpus.

4. The method of claim 3, further comprising:
determining that the term does not appear in the text corpus; and
replacing the corpus frequency occurrence of the term in the text corpus with a default non-zero number when the term does not appear in the text corpus.

5. The method of claim 1, further comprising determining the corpus frequency occurrence of the term by determining the corpus frequency occurrence of the term from a subset of documents in the text corpus.

6. The method of claim 1, wherein determining the one or more related terms associated with the key term based on the similarity threshold relative to the key term comprises determining the similarity threshold relative to the key term based on determining a threshold distance from each of the one or more related terms and the key term in n-dimensional vector space.

7. The method of claim 1, further comprising:
generating a word embedding for each term of the plurality of terms; and
generating a vector mapping comprising one or more terms based on the word embedding corresponding to the one or more terms.

8. The method of claim 6, further comprising:
receiving an indication of a user selection to expand the topic cluster;
adjusting, in response to the indication of a user selection to expand the topic cluster, the threshold distance from the key term in the n-dimensional vector space to include one or more additional related terms associated with the key term;
modifying the topic cluster to comprise the key term, the one or more related terms associated with the key term, and the one or more additional related terms associated with the key term; and
providing, for presentation on the client device and in response to the indication of the user selection to expand the topic cluster, an additional electronic text document from the first plurality of multiple electronic text documents that includes at least one term from the one or more additional related terms associated with the key term.

9. The method of claim 1, wherein:
providing the first electronic text document from the first plurality of multiple electronic text documents that corresponds to the first new topic cluster comprises providing the first electronic text document based upon a user selection of the first new topic cluster.

10. A system comprising:
at least one processor; and
at least one non-transitory computer-readable storage medium storing instructions that, when executed by the at least one processor, cause the system to:
access a first plurality of multiple electronic text documents comprising a plurality of terms;
analyze the plurality of terms to determine a statistically improbable phrase (SIP) value for each term by comparing a frequency occurrence of the term in the first plurality of multiple electronic text documents with a corpus frequency occurrence of the term in a text corpus, wherein the first plurality of multiple electronic text documents is from a separate data source than the text corpus;

identify a first key term from the plurality of terms based on the first key term having a highest SIP value;

determine, from the plurality of terms, a first set of related terms associated with the first key term;

generate a first topic cluster comprising the first key term and the first set of related terms associated with the first key term;

provide, for presentation on a client device associated with a user, a graphical user interface comprising a selectable option to identify the first key term with the first topic cluster as a first topic of interest;

designate the first key term and the first topic cluster as the first topic of interest based on receiving an indication of a user selection of the selectable option;

split the first topic cluster into a first new topic cluster and a second new topic cluster by:

receiving an indication of a user selection of a term to exclude from the first topic cluster;

determining at least one term, from the first set of related terms, to associate with the term to exclude based on the at least one term meeting a similarity threshold relative to the term to exclude;

generating the first new topic cluster by removing the term to exclude and the at least one term associated with the term to exclude from the first topic cluster; and generating the second new topic cluster by combining the term to exclude and the at least one term associated with the term to exclude;

provide, to the client device, a first electronic text document from the first plurality of multiple electronic text documents that corresponds to the first new topic cluster and a second electronic text document from the first plurality of multiple electronic text documents that corresponds to the second new topic cluster;

receive, via the client device, an indication of an additional user selection to merge the first new topic cluster with the second new topic cluster;

in response to receiving the additional user selection, merge the second new topic cluster with the first new topic cluster to create a merged topic cluster; and based on merging the second new topic cluster with the first new topic cluster, modify the graphical user interface to include a selectable option corresponding to the merged topic cluster.

11. The system of claim 10, further comprising instructions that, when executed by the at least one processor, cause the system to:

display, within the graphical user interface, the first electronic text document including at least one term corresponding to the first new topic cluster; and emphasize the at least one term in the first electronic text document.

12. The system of claim 10, further comprising instructions that, when executed by the at least one processor, cause the system to:

identify a second key term from the plurality of terms based on the second key term having a second highest SIP value;

determine, from the plurality of terms, a second set of related terms associated with the second key term; and generate a second topic cluster comprising the second key term and the second set of related terms associated with the second key term.

13. The system of claim 12, further comprising instructions that, when executed by the at least one processor, cause the system to provide, via the graphical user interface, a coverage graphic comprising a percentage of the first plurality of multiple electronic text documents included in the merged topic cluster.

14. The system of claim 13, further comprising instructions that, when executed by the at least one processor, cause the system to provide, for presentation to the user and in response to the indication of the user selection to merge the first topic cluster with the second topic cluster, one or more electronic text documents from the first plurality of multiple electronic text documents that include at least one term from the merged topic cluster.

15. The system of claim 14, further comprising instructions that, when executed by the at least one processor, cause the system to organize a presentation of topic clusters within the graphical user interface to list the first topic cluster before the second topic cluster based on the first key term associated with the first topic cluster having a higher SIP value than the second key term associated with the second topic cluster.

16. The system of claim 15, further comprising instructions that, when executed by the at least one processor, cause the system to:

receive an indication of a user selection to add a topic cluster to the presentation of topic clusters within the graphical user interface;

generate an additional topic cluster comprising an additional key term identified based on the determined SIP values and corresponding related terms associated with the additional key term; and provide, for presentation to the user and in response to the indication of the user selection to add a topic cluster, one or more electronic text documents from the first plurality of multiple electronic text documents that include at least one term from the additional topic cluster.

17. A non-transitory computer-readable medium storing instructions thereon that, when executed by at least one processor, cause a computing device to:

access a first plurality of multiple electronic text documents comprising a plurality of terms;

analyze the plurality of terms to determine a statistically improbable phrase (SIP) value for each term by comparing a frequency occurrence of the term in the first plurality of multiple electronic text documents with a corpus frequency occurrence of the term in a text corpus, wherein the first plurality of multiple electronic text documents is from a separate data source than the text corpus;

identify, based on the SIP value determined for each term, a key term from the plurality of terms;

determine, from the plurality of terms, one or more related terms associated with the key term based on the one or more related terms meeting a similarity threshold relative to the key term;

generate a topic cluster comprising the key term and the one or more related terms associated with the key term;

provide, for presentation on a client device associated with a user, a graphical user interface comprising a selectable option to identify the key term with the topic cluster as a first topic of interest;

designate the key term and the topic cluster as the first topic of interest based on receiving an indication of a user selection of the selectable option;

split the topic cluster into a first new topic cluster and a second new topic cluster by:

receiving an indication of a user selection of a term to exclude from the topic cluster;

determining at least one term, from the one or more related terms, to associate with the term to exclude based on the at least one term meeting a similarity threshold relative to the term to exclude;

generating the first new topic cluster by removing the term to exclude and the at least one term associated with the term to exclude from the topic cluster; and generating the second new topic cluster by combining the term to exclude and the at least one term associated with the term to exclude;

provide, to the client device, a first electronic text document from the first plurality of multiple electronic text documents that corresponds to the first new topic cluster and a second electronic text document from the first plurality of multiple electronic text documents that corresponds to the second new topic cluster;

receive, via the client device, an indication of an additional user selection to merge the first new topic cluster with the second new topic cluster;

in response to receiving the additional user selection, merge the second new topic cluster with the first new topic cluster to create a merged topic cluster; and based on merging the second new topic cluster with the first new topic cluster, modify the graphical user interface to include a selectable option corresponding to the merged topic cluster.

18. The non-transitory computer-readable medium of claim 17, further comprising instructions that, when executed by the at least one processor, cause the computing device to:

display, within the graphical user interface, the first electronic text document that includes at least one term corresponding to the first new topic cluster; and emphasize the at least one term in the first electronic text document.

19. The non-transitory computer-readable medium of claim 17, further comprising instructions that, when executed by the at least one processor, cause the computing device to:

receive an indication of a user selection to save the first new topic cluster; and associate the first electronic text document from the first plurality of multiple electronic text documents with the first new topic cluster based on the indication of the user selection to save the first new topic cluster.

20. The non-transitory computer-readable medium of claim 17, further comprising instructions that, when executed by the at least one processor, cause the computing device to:

identify a second key term from the plurality of terms based on the second key term having a second highest SIP value;

determine, from the plurality of terms, a second set of related terms associated with the second key term; and generate a second topic cluster comprising the second key term and the second set of related terms associated with the second key term.

* * * * *